(12) United States Patent
Kinoshita

(10) Patent No.: US 10,237,466 B2
(45) Date of Patent: Mar. 19, 2019

(54) RECOGNITION OF DEGREE OF FOCUS OF AN IMAGE

(71) Applicant: SONY CORPORATION, Tokyo (JP)

(72) Inventor: Masaya Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/109,859

(22) PCT Filed: Jan. 6, 2015

(86) PCT No.: PCT/JP2015/050093
§ 371 (c)(1),
(2) Date: Jul. 6, 2016

(87) PCT Pub. No.: WO2015/107927
PCT Pub. Date: Jul. 23, 2015

(65) Prior Publication Data
US 2016/0330366 A1 Nov. 10, 2016

(30) Foreign Application Priority Data
Jan. 17, 2014 (JP) .................................. 2014-006724

(51) Int. Cl.
*H04N 5/232* (2006.01)
*G03B 13/00* (2006.01)
*G03B 17/18* (2006.01)

(52) U.S. Cl.
CPC ......... *H04N 5/23212* (2013.01); *G03B 17/18* (2013.01); *H04N 5/23219* (2013.01);
(Continued)

(58) Field of Classification Search
CPC ........... H04N 5/23212; H04N 5/23293; H04N 1/00477; G02B 27/16; G02B 27/40;
(Continued)

(56) References Cited

U.S. PATENT DOCUMENTS

2005/0206774 A1* 9/2005 Tsujimoto .......... H04N 5/23293
348/345
2006/0182433 A1* 8/2006 Kawahara ................ G03B 3/10
396/123
(Continued)

FOREIGN PATENT DOCUMENTS

JP 2003-262909 A 9/2003
JP 2005-062469 A 3/2005
(Continued)

OTHER PUBLICATIONS

International Search Report Received for PCT Application No. PCT/JP2015/050093, dated Apr. 14, 2015, pp. 2.
(Continued)

*Primary Examiner* — Kelly L Jerabek
(74) *Attorney, Agent, or Firm* — Chip Law Group

(57) ABSTRACT

The present technology relates to an image processing device and method, and a program for enabling easier recognition of the degree of focus of an image after photographing.
A focus area determining unit calculates focus scores based on a photographed image, the focus scores indicating the degrees of focus of the respective areas in the photographed image. A warning control unit determines the degree of focus of a predetermined area in the photographed image in accordance with the focus scores for the respective areas, and issues a warning instruction in accordance with a result of the determination. The warning is issued by displaying the warning, outputting a warning sound, vibrating, or emitting light, for example. As the degree of focus is determined in accordance with the focus scores, neither blurring nor defocusing is caused, and the user can be prompted to check the degree of focus. The present technology can be applied to digital still cameras.

18 Claims, 37 Drawing Sheets

(52) U.S. Cl.
CPC ..... *H04N 5/23222* (2013.01); *H04N 5/23293* (2013.01); *H04N 5/23216* (2013.01)

(58) Field of Classification Search
CPC ........ G03B 13/18; G03B 13/24; G03B 13/36; G03B 13/00; G03B 13/16; G03B 17/20; G03B 2217/18
USPC .......................... 348/345–349, 333.01–333.04
See application file for complete search history.

(56) References Cited

U.S. PATENT DOCUMENTS

| | | | | |
|---|---|---|---|---|
| 2009/0244358 A1* | 10/2009 | Senoo | ................ | H04N 5/23212 348/345 |
| 2010/0110279 A1* | 5/2010 | Koguchi | ................ | G03B 15/03 348/362 |
| 2011/0193984 A1* | 8/2011 | Kitaya | ................ | G06T 1/00 348/222.1 |
| 2012/0162456 A1* | 6/2012 | Choi | ................ | H04N 5/23219 348/220.1 |
| 2014/0176784 A1* | 6/2014 | Hongu | ................ | H04N 5/23212 348/349 |
| 2014/0332661 A1* | 11/2014 | Fukuda | ................ | H04N 5/23212 250/201.7 |

FOREIGN PATENT DOCUMENTS

| | | |
|---|---|---|
| JP | 2010-286791 A | 12/2010 |
| JP | 2013-210572 A | 10/2013 |

OTHER PUBLICATIONS

Written Opinion received for PCT Application No. PCT/JP2015/050093, dated Apr. 14, 2015, pp. 5.

International preliminary report on patentability received for PCT Application No. PCT/JP2015/050093, dated Jul. 19, 2016, pp. 5.

Office Action for CN Patent Application No. 201580004045.9, dated Oct. 31, 2018, 06 pages of Office Action and 11 pages of English Translation.

* cited by examiner

FIG. 1
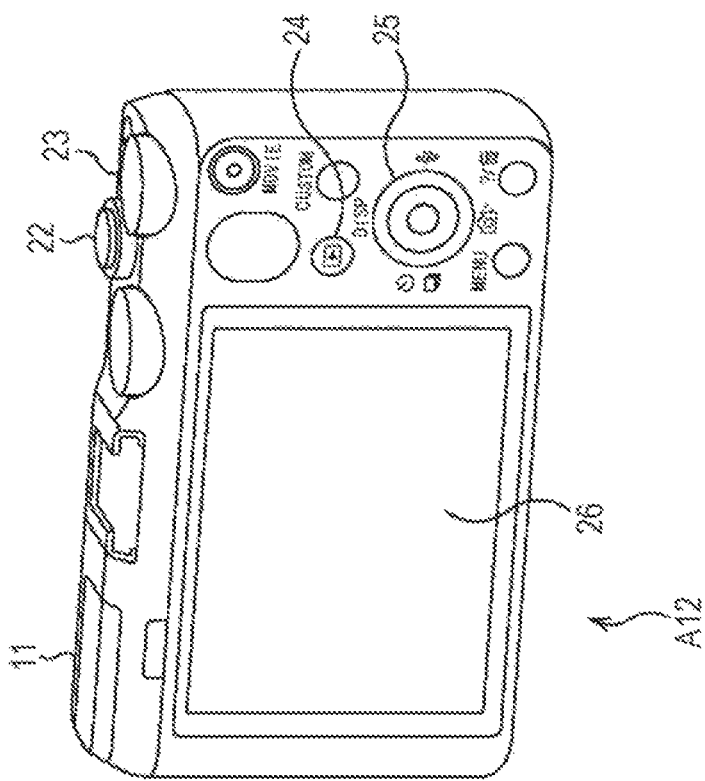
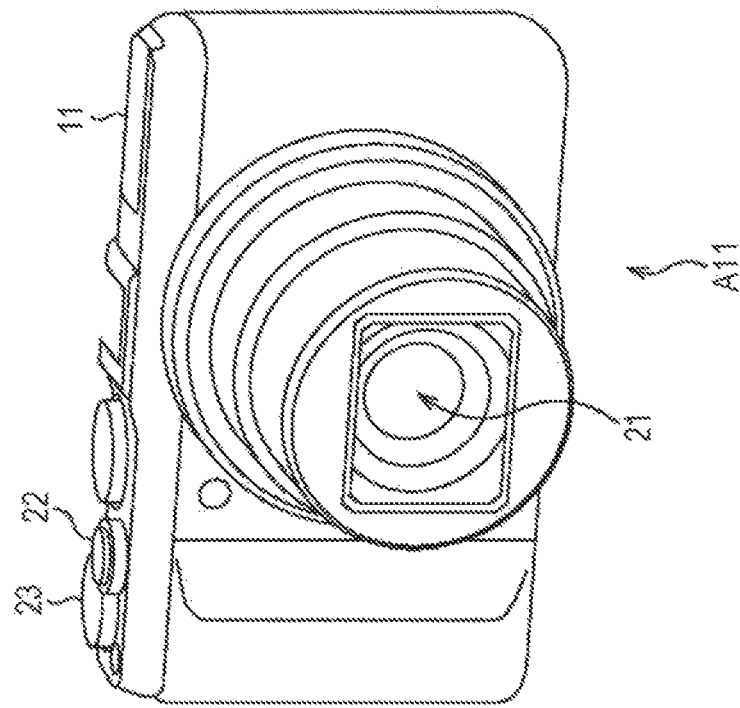

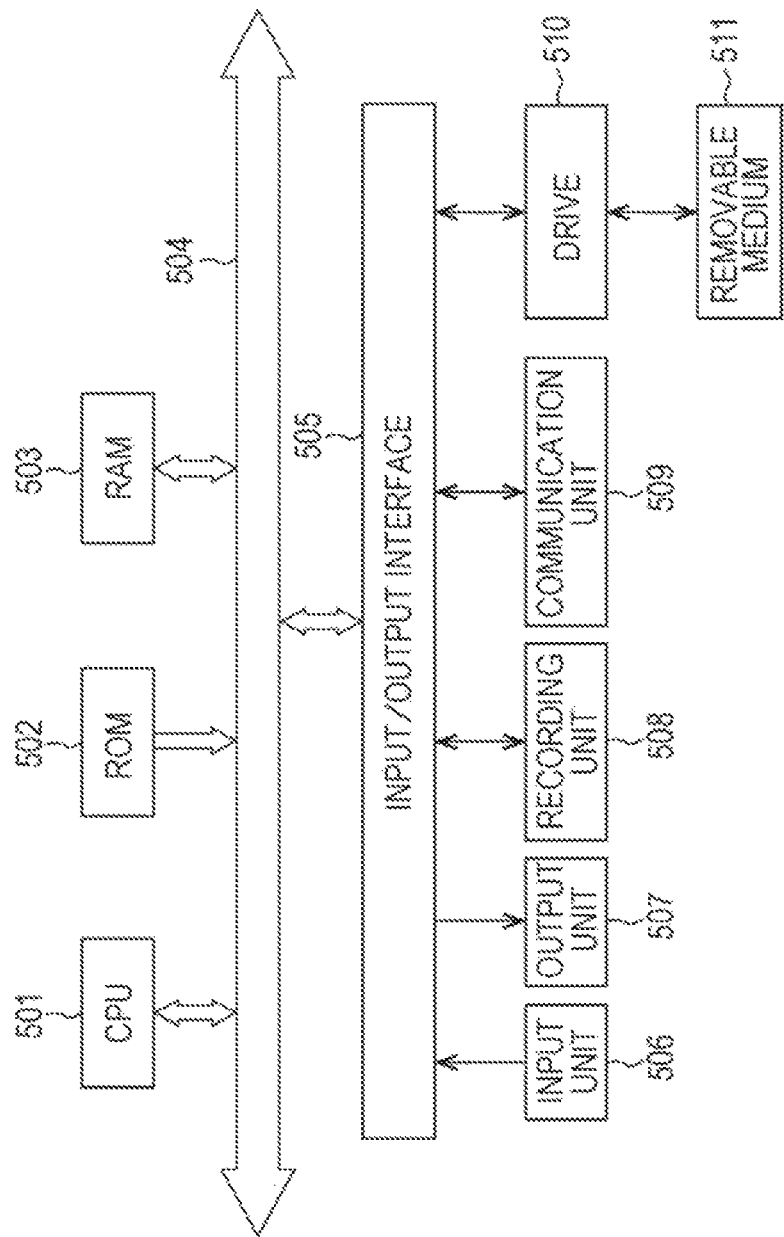

US 10,237,466 B2

RECOGNITION OF DEGREE OF FOCUS OF AN IMAGE

CROSS REFERENCE TO RELATED APPLICATIONS

This application is a U.S. National Phase of International Patent Application No. PCT/JP2015/050093 filed on Jan. 6, 2015, which claims priority benefit of Japanese Patent Application No. 2014-006724 filed in the Japan Patent Office on Jan. 17, 2014. Each of the above-referenced applications is hereby incorporated herein by reference in its entirety.

TECHNICAL FIELD

The present technology relates to image processing devices and methods, and programs, and more particularly, to an image processing device and method, and a program for enabling easier recognition of a degree of focus of an image after photographing.

BACKGROUND ART

In recent digital cameras and mobile phones equipped with digital cameras, imaging devices have a larger number of pixels or recording pixels, and the display devices installed for checking photographed images have become smaller in size and larger in the number of pixels.

However, the number of pixels of a display device that is normally installed is not sufficient compared with the increase in the number of pixels in imaging devices (recording pixels).

Because of this, even after an image taken with a reproduction function is checked immediately after photographing, and focus is confirmed, a user is often disappointed at defocusing when the image is displayed on a large-sized monitor of a television receiver or a personal computer at home, or when the image is enlarged in size and is printed out with a printer, for example.

To counter this, there have been suggested techniques by which the state of a device such as a trace of camera shake or motion at the time of photographing is measured, and a warning is displayed to the photographer if the result of the photographing is likely to be adversely affected by such a state (see Patent Documents 1 through 3). These techniques have been put into practical use.

CITATION LIST

Patent Documents

Patent Document 1: JP 3402774 B2
Patent Document 2: JP 3144469 B2
Patent Document 3: JP 5163409 B2

SUMMARY OF THE INVENTION

Problems to be Solved by the Invention

By the above techniques, however, a predictive warning is issued in accordance with the state at the time of photographing, and any warning about an actually photographed and recorded image is not issued. Even in a case where a user performs photographing without worry because there is no display of a warning, a degree of focus of an actually photographed and recorded image is often insufficient.

Also, the techniques disclosed in Patent Documents 1 and 2 are designed for correcting only camera shake as the cause of failed photographing. Therefore, by those techniques, any warning is not displayed when a degree of focus becomes insufficient due to optical defocusing or the like, and the photographer cannot notice that the photographing is failed.

Likewise, the technique disclosed in Patent Document 3 is designed for correcting only the disparities generated as the cause of failed photographing at the time of panoramic photographing. Therefore, by this technique, any warning is not displayed when a degree of focus becomes insufficient due to optical defocusing or camera shake, for example, and the photographer cannot notice that the photographing is failed.

The present technology has been developed in view of those circumstances, and is to enable easier recognition of the degree of focus of an image after photographing.

Solutions to Problems

An image processing device of one aspect of the present technology includes: a focus area determining unit that calculates focus scores based on a photographed image, the focus scores indicating the degrees of focus of respective areas in the photographed image; a warning determining unit that determines the degree of focus in a predetermined area in the photographed image in accordance with the focus scores; and a warning unit that issues a warning in accordance with a result of the focus determination.

The warning determining unit may determine the degree of focus by comparing the average value of the focus scores for respective areas in the predetermined area with a threshold value.

The predetermined area may be a focus area subjected to focusing at the time when the photographed image is taken.

The focus area determining unit may calculate the focus scores only for the predetermined area in the photographed image.

The predetermined area may be an area designated by a user in the photographed image.

The predetermined area may be a face area detected from the photographed image.

The warning unit may issue the warning by displaying the warning superimposed on the photographed image.

The warning unit may issue the warning by outputting a warning sound.

The warning unit may issue the warning by vibrating.

The warning unit may issue the warning by emitting light.

The warning unit may change the warning in accordance with the average value of the focus scores.

An image processing method or a program of one aspect of the present technology includes the steps of: calculating focus scores based on a photographed image, the focus scores indicating the degrees of focus of respective areas in the photographed image; determining the degree of focus in a predetermined area in the photographed image in accordance with the focus scores; and issuing a warning in accordance with a result of the focus determination.

In the aspect of the present technology, focus scores based on a photographed image are calculated, the focus scores indicating the degrees of focus of respective areas in the photographed image. The degree of focus in a predetermined area in the photographed image is determined in accordance with the focus scores. A warning is issued in accordance with a result of the focus determination.

Effects of the Invention

According to one aspect of the present technology, the degree of focus of an image after photographing can be more easily recognized.

The effects of the present technology are not limited to the effects described herein, and may include any of the effects described in the present disclosure.

BRIEF DESCRIPTION OF DRAWINGS

FIG. 1 is a diagram showing an example structure of the exterior of an imaging apparatus.

FIG. 37 is a diagram showing an example configuration of a computer.

MODES FOR CARRYING OUT THE INVENTION

Figure 2:
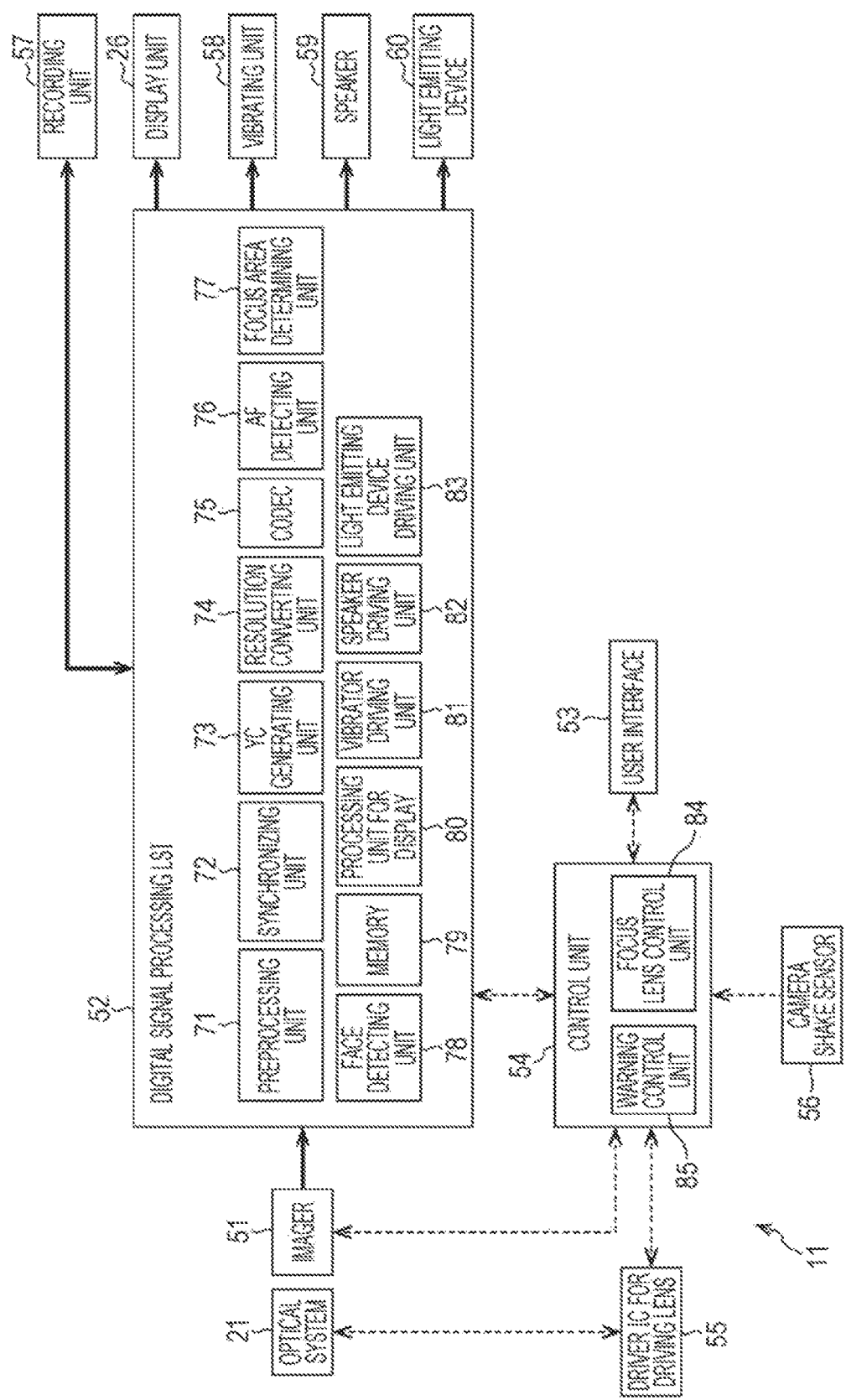
FIG. 2 is a diagram showing an example functional structure of the imaging apparatus.

The following is a description of embodiments to which the present technology is applied, with reference to the drawings.

First Embodiment

<Example Structure of the Exterior of an Imaging Apparatus>

First, the outline of the present technology is described.

The present technology enables a user as a photographer to more easily and intuitively recognize the degree of focus of an image blurred by camera shake or optical defocusing after taking a photograph, even if the display screen is small.

For example, even in a conventional situation where a user cannot notice that the degree of focus is insufficient since images are displayed on a small-sized display device, the user can be prevented from missing a chance to take a photograph due to his/her unawareness of the failed photographing, if the user is able to more easily and intuitively notice the degree of focus. Particularly, by the present technology, a degree of focus is not predicted from the state prior to photographing, but a warning about the degree of focus of an actually photographed image is issued. Thus, the user can promptly perform photographing again as necessary.

The present technology can be applied to any devices capable of taking images, such as a digital still camera, a digital video camera, a multifunctional portable telephone device having a camera function, and a wearable camera. In the description below, an example where the present technology is applied to a digital still camera is first described.

FIG. 1 is a diagram showing an example structure of the exterior of an imaging apparatus to which the present technology is applied.

An imaging apparatus 11 is formed with a digital still camera. In FIG. 1, the drawing indicated by an arrow A11 is a front view of the imaging apparatus 11, and the drawing indicated by an arrow A12 is a back view of the imaging apparatus 11.

An optical system 21 that guides light entering from an object toward an imager (not shown) is provided on the surface of the imaging apparatus 11, and the user directs the optical system 21 toward a desired object, to photograph the object.

A shutter button 22 and a dial 23 are provided on the upper surface of the imaging apparatus 11, and a reproduction button 24 and a dial 25 are provided on the back surface of the imaging apparatus 11. The user performs operation such as photographing and reproduction by operating these parts including the shutter buttons and dials 22 through 25.

Further, a display unit 26 formed with a liquid crystal panel or the like is provided on the back surface of the imaging apparatus 11, and the user can check a photographed image, the degree of focus of the image, and the like by looking at the image and the like displayed on the display unit 26.

<Example Functional Structure of the Imaging Apparatus>

The functional structure of the imaging apparatus 11 shown in FIG. 1 is like the structure shown in FIG. 2, for example. In FIG. 2, the components equivalent to those shown in FIG. 1 are denoted by the same reference numerals as those used in FIG. 1, and explanation of them will not be unnecessarily repeated.

The imaging apparatus 11 in FIG. 2 includes the optical system 21, an imager 51, a digital signal processing Large Scale Integration (LSI) 52, a user interface 53, a control unit 54, a driver Integrated Circuit (IC) 55 for driving the lens, a camera shake sensor 56, a recording unit 57, the display unit 26, a vibrating unit 58, a speaker 59, and a light emitting device 60.

The optical system 21 is formed with lenses such as a zoom lens and a focusing lens, and a diaphragm. The optical system 21 gathers light entering from an object onto the light receiving surface of the imager 51.

The imager 51 is formed with an imaging device such as a Charge Coupled Device (CCD) or a Complementary Metal Oxide Semiconductor (CMOS). The imager 51 receives light entering from the optical system 21, and performs photoelectric conversion on the light. The imager 51 then supplies the resultant photographed image, or more specifically, the image data of the photographed image, to the digital signal processing LSI 52.

The digital signal processing LSI 52 performs various kinds of signal processing on the photographed image supplied from the imager 51. The digital signal processing LSI 52 includes a preprocessing unit 71, a synchronizing unit 72, a YC generating unit 73, a resolution converting unit 74, a CODEC 75, an AutoFocus (AF) detecting unit 76, a focus area determining unit 77, a face detecting unit 78, a memory 79, a processing unit 80 for display, a vibrator driving unit 81, a speaker driving unit 82, and a light emitting device driving unit 83.

The preprocessing unit 71 performs a clamping process, a defective pixel correcting process, and the like on a photographed image. The synchronizing unit 72 performs a demosaicing process on the photographed image so that each of the pixels of the photographed image subjected to the defective pixel correcting process and the like have the respective color components R, G, and B.

The YC generating unit 73 generates a luminance signal and a color signal from the photographed image subjected to the demosaicing process. The resolution converting unit 74 performs resolution conversion on the photographed image. The CODEC 75 encodes the photographed image subjected to the resolution conversion, or decodes the encoded photographed image.

The AF detecting unit 76 calculates an evaluation value indicating an autofocus status using the photographed image or the like when an autofocusing operation is performed. The focus area determining unit 77 performs a focus area determining process based on the photographed image subjected to the demosaicing process, and calculates focus scores indicating the degrees of focus in the respective areas in the photographed image.

The face detecting unit 78 detects the face of a person from the photographed image. The memory 79 temporarily stores the photographed image processed by some or all of the processors from the preprocessing unit 71 to the resolution converting unit 74 (the photographed image will be hereinafter also referred to as the processed photographed image) and the like. The processing unit 80 for display converts the photographed image into an image in a format that can be displayed on the display unit 26, and then supplies the image to the display unit 26.

The vibrator driving unit 81 drives and vibrates the vibrating unit 58. The speaker driving unit 82 supplies an audio signal to the speaker 59, and causes the speaker 59 to reproduce sound. The light emitting device driving unit 83 drives the light emitting device 60 to emit light.

The user interface 53 is formed with the components from the shutter button 22 to the dial 25 shown in FIG. 1, and a touch panel placed on the display unit 26, for example. The user interface 53 supplies a signal in accordance with a user operation to the control unit 54.

The control unit 54 controls operation of the entire imaging apparatus 11. For example, the control unit 54 controls formation of the photographed image by the imager 51, for example. The control unit 54 performs optical image stabilization by controlling the lens driver IC 55 and moving the lens of the optical system 21 in accordance with an output from the camera shake sensor 56, or drives the diaphragm of the optical system 21 by controlling the lens driver IC 55.

The control unit 54 further includes a focus lens control unit 84 and a warning control unit 85. The focus lens control unit 84 controls the lens driver IC 55 in accordance with the evaluation value supplied from the AF detecting unit 76, and causes the lens driver IC 55 to perform a focusing operation. The warning control unit 85 instructs the respective components of the digital signal processing LSI 52 to perform processing for a warning about the degree of focus of the photographed image.

Under the control of the control unit 54, the lens driver IC 55 performs a focusing operation by moving the focus lens and the like of the optical system 21, drives the diaphragm, or performs optical image stabilization. The camera shake sensor 56 is formed with a gyro sensor, for example. The camera shake sensor 56 detects motion of the imaging apparatus 11, and supplies the detected result to the control unit 54.

The recording unit 57 is formed with a removable medium that can be detachably attached to the imaging apparatus 11, for example. The recording unit 57 records data such as the photographed image supplied from the digital signal processing LSI 52, or supplies recorded data to the digital signal processing LSI 52.

Under the control of the vibrator driving unit 81, the vibrating unit 58 vibrates in a predetermined pattern, to vibrate the imaging apparatus 11. The speaker 59 reproduces sound in accordance with the audio signal supplied from the speaker driving unit 82. The light emitting device 60 is formed with a Light Emitting Diode (LED) or the like, and emits light in a predetermined pattern under the control of the light emitting device driving unit 83.

<Outline of Processing to be Performed by the Imaging Apparatus>

Figure 3:
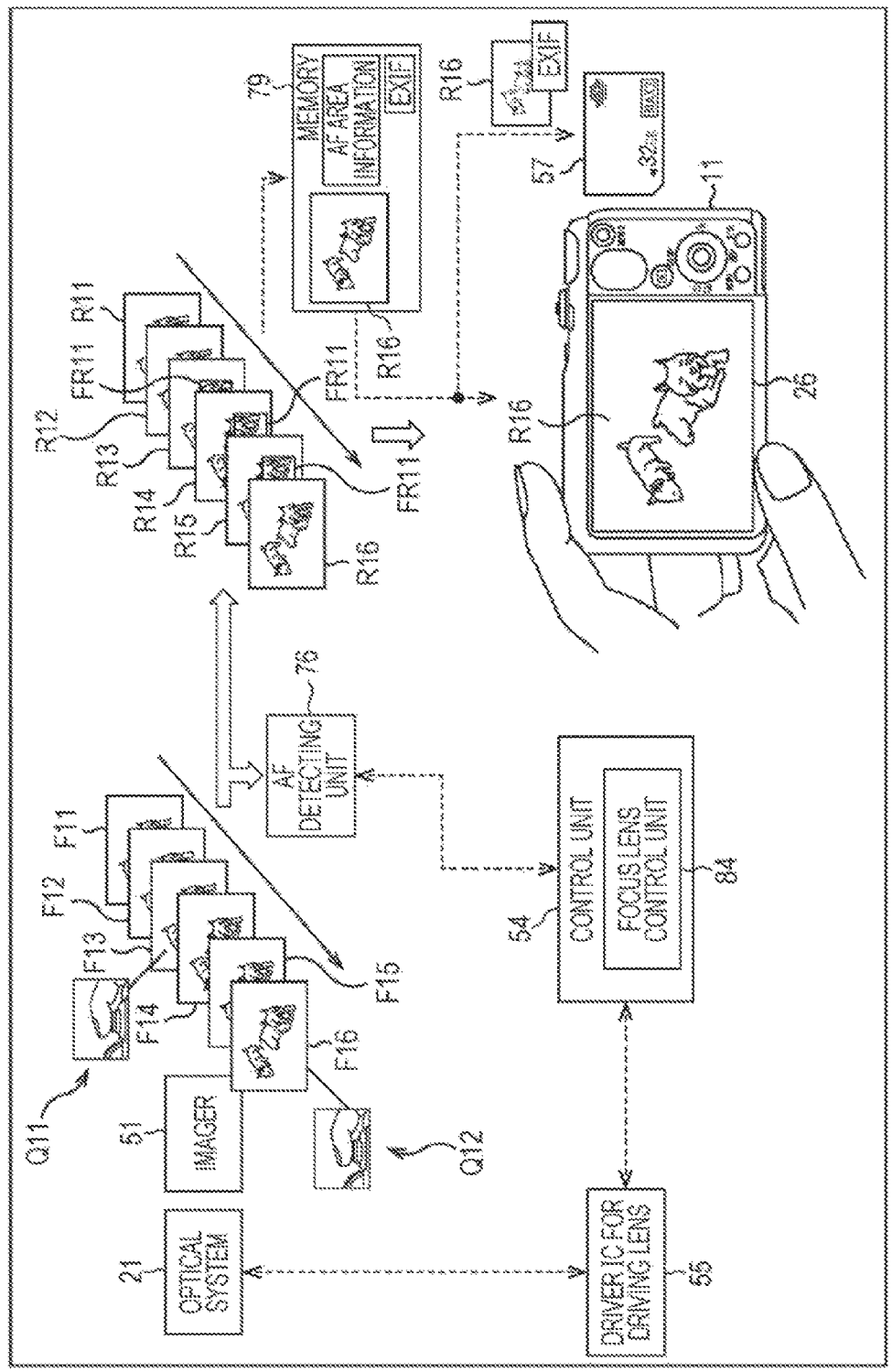
FIG. 3 is a diagram for explaining a photographing process.
Figure 4:
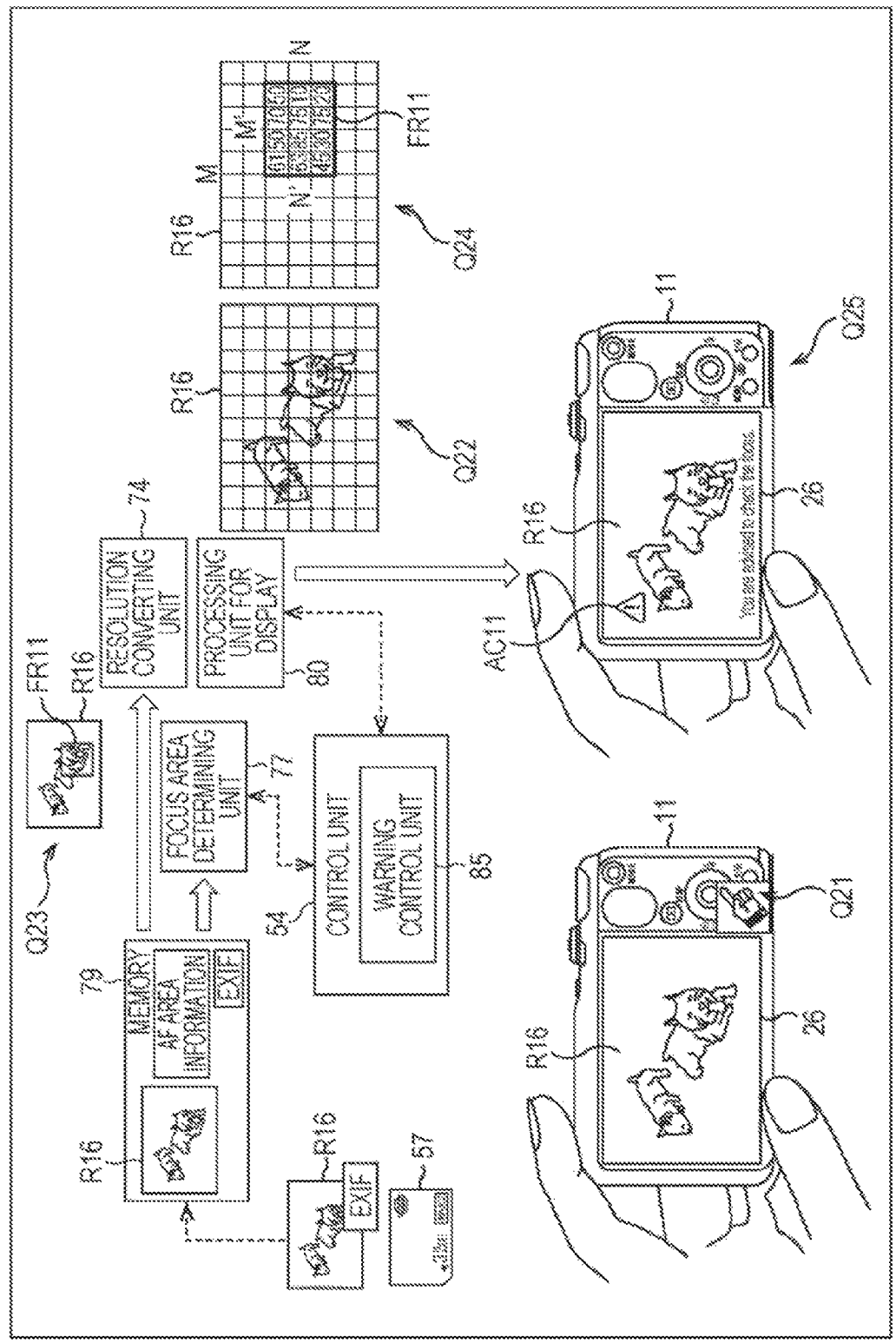
FIG. 4 is a diagram for explaining a warning process.

Referring now to FIGS. 3 and 4, the outline of processing to be performed by the imaging apparatus 11 is described. In this example, autofocus photographing is performed.

As shown in FIG. 3, when a photographing operation is started, the imager 51 receives light entering via the optical system 21, and performs photoelectric conversion, for example. As a result, photographed images F11 through F16 at the respective times or of the respective frames are obtained.

Of the photographed images F11 through F16, an image closer to the front side in the drawing is a newer image, or is an image taken at a time closer to the current time. In this example, the image taken first is the photographed image F11, and the image taken last is the photographed image F16.

When such photographed images of the respective frames are taken, the AF detecting unit 76 calculates the evaluation value indicating an autofocus status based on the photographed images of the respective frames, and supplies the evaluation value to the control unit 54. The focus lens control unit 84 of the control unit 54 controls the lens driver IC 55 in accordance with the evaluation value supplied from the AF detecting unit 76, and causes the lens driver IC 55 to perform a focusing operation.

With this, the focus lens and the like of the optical system 21 are driven by the lens driver IC 55, to focus on the object.

After the photographed images F11 through F16 of the respective frames are obtained, processing is sequentially performed on these photographed images, and the resultant photographed images R11 through R16 are sequentially displayed, as through-the-lens images at the time of photographing, on the display unit 26.

The user checks the object by looking at the through-the-lens image displayed on the display unit 26, and performs photographing by operating the shutter button 22 and the like.

In this example, as indicated by an arrow Q11, the user presses the shutter button 22 halfway when extracting the photographed image F13 (at a time of photographing). As a result, an autofocus target frame FR11 is displayed on the photographed image R13 that is the through-the-lens image corresponding to the photographed image F13, and in the photographed images R14 and R15 of the frames that follow.

This frame FR11 is an image of a frame showing the area onto which the focus lens control unit 84 is to focus, and the size of the frame FR11 varies among the respective frames depending on the size of the object in the photographed images.

When determining that the object in the frame FR11 has been brought into focus, the user presses the shutter button 22 completely, or pushes the shutter button 22 deeper than at the time of half-pressing, and thus issues an instruction to take an image.

In this example, as shown in an arrow Q12, the shutter button 22 is pressed completely when the photographed image F16 is extracted. As a result, the photographed image R16 obtained by processing the photographed image F16 is captured as the image obtained by photographing.

The photographed image R16 obtained in this manner is stored into the memory 79 as shown in the right side in the drawing. The photographed image R16 is then recorded into the recording unit 57, and is displayed, as a preview image after the photographing, on the display unit 26. A preview image is an image displayed immediately after photographing, so that the user can check the photographed image.

In the imaging apparatus 11, at the same time as the storing of the photographed image R16 into the memory 79, information indicating the AF target area or the area brought into focus in the autofocusing at the time when the photographed image F16 was taken is also stored as AF area information into the memory 79.

In a case where a focusing operation is performed by a contrast method, for example, the AF area information is the information indicating the AF target area determined by the focus lens control unit 84, or the autofocus target frame FR11.

In a case where a focusing operation is performed by a phase difference sensor method, for example, the AF area information is the information indicating the AF point selected as the position to be brought into focus at the time of photographing of the photographed image F16 among predetermined AF points.

In the example shown in FIG. 3, the memory 79 stores not only the AF area information but also Exchangeable Image File Format (EXIF) data containing the AF area information. The EXIF data is the data to be attached as metadata to the photographed image R16, and the AF area information is recorded into a free area of the EXIF data, for example.

After the photographed image R16, the AF area information, and the EXIF data are stored into the memory 79 in the above manner, the EXIF data is attached to the photographed image R16, and the photographed image R16 accompanied by the EXIF data is recorded into the recording unit 57. The photographed image R16 is also displayed, as the preview image after the photographing, on the display unit 26.

While the photographed image R16 is displayed as the preview image, the user further operates the user interface 53 to issue an instruction to check the degree of focus, for example, as indicated by an arrow Q21 in a lower left portion in FIG. 4.

The imaging apparatus 11 then checks whether the degree of focus of the photographed image R16 is sufficient, and conducts a warning process to issue a warning as necessary.

The warning process may be started when an instruction is issued from the user, or may be automatically started in accordance with a menu setting or the like. In the latter case, after a predetermined time has passed since the display of the preview image, for example, the warning process is automatically started.

When the warning process is started, the photographed image R16 as the current target is first read from the recording unit 57 as necessary, and is then supplied to the memory 79. If the warning process is performed immediately after photographing, the photographed image R16 is already stored in the memory 79, and therefore, loading of the photographed image R16 is not necessary. In such a case, the AF area information and the EXIF data are also stored in the memory 79.

The warning control unit 85 of the control unit 54 then instructs the focus area determining unit 77 to perform a focus area determining process.

The focus area determining unit 77 in turn reads the photographed image R16 from the memory 79, and performs a focus area determining process on the photographed image R16.

In the focus area determining process, the photographed image R16 is divided into M areas in the horizontal direction and N areas in the vertical direction, for example, as indicated by an arrow Q22 in the drawing. That is, the entire photographed image R16 is divided into (M×N) areas. A focus score indicating a degree of focus is calculated for each of the (M×N) areas, and the focus scores for the respective areas are supplied as the results of the focus area determining process to the warning control unit 85.

As indicated by an arrow Q23, the warning control unit 85 then sets the current determination target area to be subjected to the determination as to whether the degree of focus is sufficient in the photographed image R16, in accordance with the AF area information or the EXIF data stored in the memory 79.

In this example, the entire area of the autofocus target frame FR11 indicated by the AF area information is the current determination target area. This current determination target area may be of any size and shape, as long as it includes the area indicated by the AF area information.

After setting the current determination target area, the warning control unit 85 calculates an average score indicating the degree of focus of the current determination target area in accordance with the focus scores for the respective areas in the current determination target area, as indicated by an arrow Q24.

In this example, the area of the frame FR11 as the current determination target area is formed with (M'×N') divisional areas, and each one square represents a divisional area. The numerical value in each square indicates a focus score.

Particularly, in the area of the frame FR11, the area with the highest focus score is the most focused area. In this example, the focus score for the most focused area is 85. The warning control unit 85 calculates the average score indicating the degree of focus in the area near the most focused area or in the area surrounding the area brought into focus in the focusing operation.

Specifically, the warning control unit 85 calculates the average score by dividing the sum of the focus scores for the respective areas in the current determination target area by the number of the areas constituting the current determination target area, or by (M'×N'). That is, the average score is the average value of the focus scores for the areas in the current determination target area.

In a case where the calculated average score is smaller than a predetermined threshold value th, the warning control unit 85 determines that the degree of focus in the portion brought into focus in the photographed image R16 obtained by photographing is insufficient, and instructs the processing unit 80 for display to display a warning.

When the average score is smaller than the threshold value th, the areas surrounding the portion brought into focus are not in focus on average, and therefore, chances are high that the photographed image R16 is blurred due to camera shake or is optically out of focus.

In accordance with the instruction from the warning control unit 85, the processing unit 80 for display superimposes information indicating a warning about the degree of focus on the photographed image R16 subjected to the resolution conversion performed by the resolution converting unit 74 as appropriate, and then causes the display unit 26 to display the superimposed image.

As a result, a warning icon AC11 superimposed on the photographed image R16 is displayed, and a warning text message, "You are advised to check the focus.", is also displayed, as indicated by an arrow Q25, for example. As the warning icon AC11 and the text message indicating a warning about the degree of focus are displayed, the user can easily and intuitively determine whether to check the image for blurring, or check the degree of focus. Seeing this display, the user closely checks the degree of focus by enlarging the photographed image R16, for example.

In the example shown in FIG. 4, the warning icon AC11 and the text message are displayed in predetermined positions on the display screen, so that the photographed image R16 is easily seen. That is, the warning icon AC11 is displayed in an upper left portion on the display screen in the drawing, and the text message is displayed in a lower portion on the display screen in the drawing.

Figure 5:
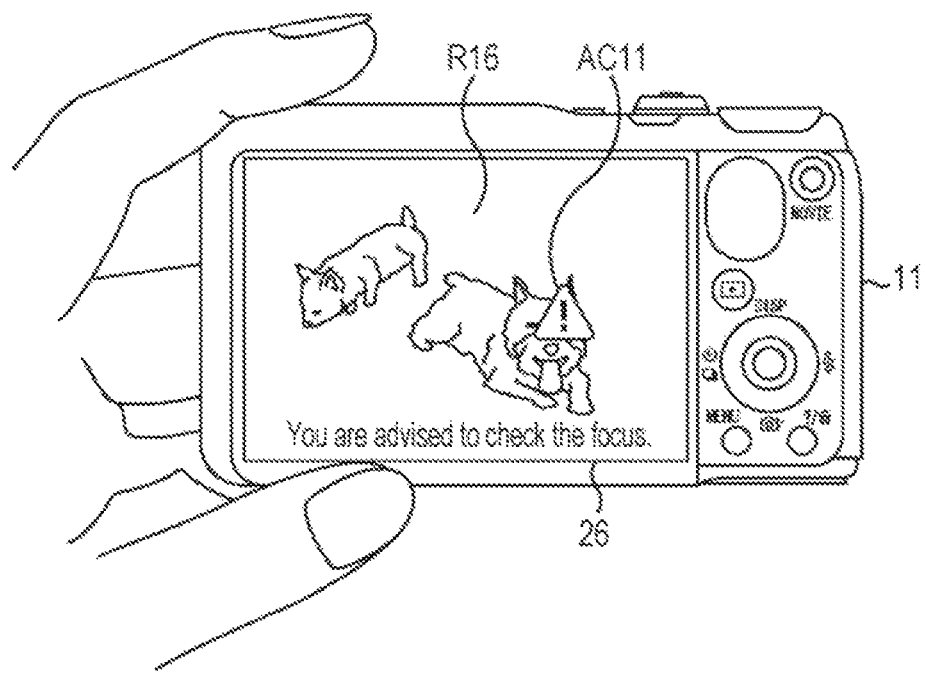
FIG. 5 is a diagram showing another example of display of a warning.

The warning icon AC11 is not necessarily displayed in the upper left portion, and may be displayed in any other portion on the display screen. For example, the warning icon AC11 may be displayed near the current determination target area, as shown in FIG. 5. In that case, the user can easily and intuitively determine which portion of the photographed image R16 is out of focus. In FIG. 5, the components equivalent to those shown in FIG. 4 are denoted by the same reference numerals as those used in FIG. 4, and explanation of them is not repeated herein.

In a case where the average score is equal to or greater than the threshold value th, and the degree of focus of the photographed image R16 is sufficient, a text message or an icon or the like to that effect may be displayed on the display unit 26.

<Description of a Photographing Process>

Next, specific operations to be conducted by the imaging apparatus 11 when the above described processing is performed are described.

Figure 6:
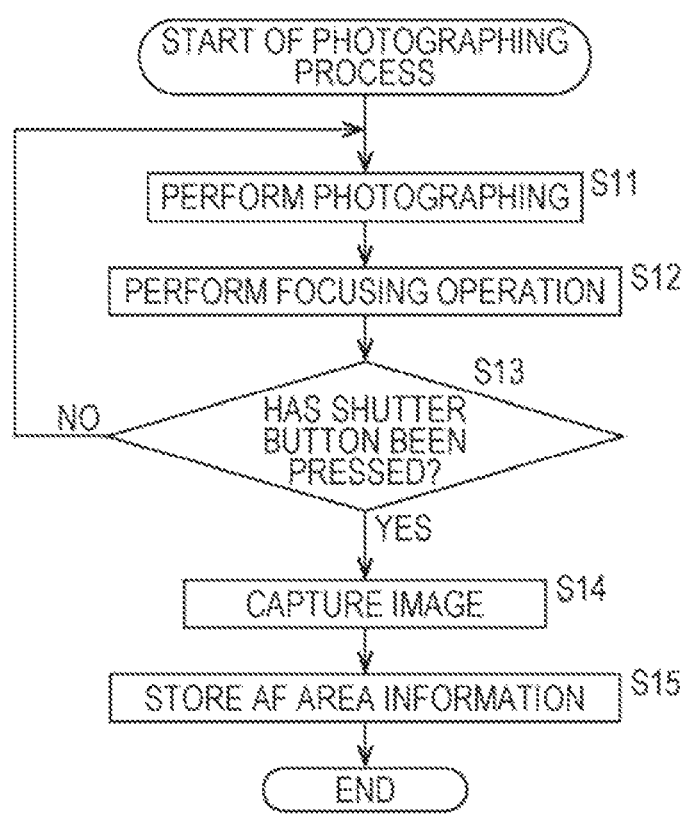
FIG. 6 is a flowchart for explaining a photographing process.

Referring first to the flowchart in FIG. 6, a photographing process to be performed by the imaging apparatus 11 is described.

In step S11, the imager 51 forms a photographed image.

Specifically, the imager 51 receives light entering from the object via the optical system 21, and performs photoelectric conversion on the light. The imager 51 then supplies the resultant photographed image to the digital signal processing LSI 52. The respective components constituting the digital signal processing LSI 52, such as the preprocessing unit 71 and the synchronizing unit 72, perform various processes on the photographed image supplied from the imager 51, to process the photographed image.

The processed photographed image is supplied to the display unit 26 by the processing unit 80 for display, and is then displayed. That is, the processed photographed image is displayed as a through-the-lens image. Further, the AF detecting unit 76 calculates an evaluation value indicating an autofocus status based on the photographed image and the focusing-operation-related information acquired by the imager 51 and the like, as necessary, and supplies the evaluation value to the focus lens control unit 84.

In step S12, the focus lens control unit 84 controls the lens driver IC 55 in accordance with the evaluation value supplied from the AF detecting unit 76, and causes the lens driver IC 55 to perform a focusing operation.

In step S13, the control unit 54 determines whether the shutter button 22 has been pressed, in accordance with a signal supplied from the shutter button 22 serving as the user interface 53. For example, immediately after the shutter button 22 is pressed completely, and an instruction for photographing is issued, the control unit 54 determines that the shutter button 22 has been pressed.

If it is determined in step S13 that the shutter button 22 has not been pressed, the process returns to step S11, and the above described procedures are repeated.

If it is determines in step S13 that the shutter button 22 has been pressed, on the other hand, the digital signal processing LSI 52 in step S14 captures the processed photographed image under the control of the control unit 54.

That is, the digital signal processing LSI 52 supplies and stores the processed photographed image, as the photographed image obtained by photographing, into the memory 79 for storage.

In step S15, the focus lens control unit 84 generates AF area information in accordance with the information used in the focusing operation at the time of photographing, and supplies and stores the AF area information into the digital signal processing LSI 52.

The digital signal processing LSI 52 supplies the AF area information supplied from the focus lens control unit 84 to the memory 79, and causes the memory 79 to store the AF area information associated with the photographed image. The AF area information may be incorporated into the EXIF data as necessary, and the EXIF data may be stored into the memory 79. The EXIF data containing the AF area information may be attached to the photographed image.

As the AF area information is stored, the photographing process comes to an end.

After the photographed image is obtained in the above manner, the obtained photographed image is supplied from the processing unit 80 for display to the display unit 26, and is then displayed as a preview image. The photographed image is also encoded by the CODEC 75 in an appropriate manner and is recorded into the recording unit 57 at an appropriate time.

<Description of a Warning Process>

A warning process is started in a case where the user issues an instruction for warning display by operating the user interface 53 while a preview image is displayed, or in a case where a preview image is displayed for a predetermined period of time in a setting where the warning process is to start automatically, for example. Referring to the flowchart in FIG. 7, a warning process to be performed by the imaging apparatus 11 is described below.

In step S41, the warning control unit 85 acquires the AF area information from the memory 79. Alternatively, the AF area information may be read from the EXIF data attached to the photographed image stored in the memory 79.

In step S42, the warning control unit 85 instructs the focus area determining unit 77 to perform a focus area determining process.

In step S43, in accordance with the instruction from the warning control unit 85, the focus area determining unit 77 reads the photographed image from the memory 79, and performs a focus area determining process.

For example, the focus area determining unit 77 divides the photographed image into (M×N) areas, and generates luminance signals for the respective pixels in each of the divisional areas. The luminance signals may be generated by the YC generating unit 73, for example.

The focus area determining unit 77 also extracts high-pass components by performing filtering on the luminance signals of the respective pixels in each divisional area, using a high-pass filter or the like. The focus area determining unit 77 then obtains the absolute values of the high-pass components. The focus area determining unit 77 further performs high-pass component noise removal and a limiting process on the absolute values of the high-pass component obtained from the respective pixels in each divisional area. The focus area determining unit 77 then calculates a focus score for the divisional area by integrating the absolute values of the high-pass components of the respective pixels in the area. That is, the sum of the absolute values of the high-pass components of the respective pixels in a divisional area is the focus score for the area.

In a photographed image, a more focused area or an area with a higher degree of focus has more edge components. In view of this, a more focused area has a greater value as its focus score that is the integrated value of the high-pass components.

The focus area determining unit 77 supplies the focus scores for the respective areas in the photographed image obtained as the results of the focus area determining process as described above, to the warning control unit 85.

The focus area determining process is not necessarily the above described process, but may be any other process to determine the degrees of focus of the respective areas in a photographed image.

For example, a discriminator (dictionary) obtained through machine learning using in-focus test images and out-of-focus or blurred test images may be used to determine focus scores for the respective areas in a photographed image. In such a case, the focus area determining unit 77 extracts feature quantities from the respective areas in the photographed image, and performs calculations by assigning the feature quantities of the respective areas to the discriminator. The values obtained as the results of the calculations are used as the focus scores.

In step S44, the warning control unit 85 obtains, from the focus area determining unit 77, the focus scores for the respective areas in the photographed image as the results of the focus area determining process.

In step S45, the warning control unit 85 extracts, from the obtained focus scores for the (M×N) areas, the focus scores for the (M'×N') areas constituting the current determination target area defined by the AF area information. For example, the area indicated by the AF area information becomes the current determination target area.

In step S46, the warning control unit 85 calculates an average score for the current determination target area in accordance with the focus scores for the (M'×N') areas constituting the current determination target area.

In the example described herein, the average score for the current determination target area is used as the information for determining whether the portion brought into focus at the time of formation of the photographed image is sufficiently in focus. However, any other information may be used.

For example, an average score for areas with high focus scores in the current determination target area may be used, or the highest focus score in the current determination target area may be used. However, a degree of focus can be determined more accurately by using an average score that is the average value of the average scores for areas, than by using the focus score for one area.

In step S47, the warning control unit 85 compares the calculated average score with the threshold value th, to determine whether the average score is smaller than the threshold value th.

If the average score is determined not to be smaller than the threshold value th in step S47, the average score for the current determination target area is sufficiently high, and the current determination target area is reasonably in focus. Therefore, it is determined that a nice-looking photographed image has been obtained, or retaking of a photographed image is not necessary. Thus, the warning process comes to an end. In such a case, if a warning process is started in accordance with an instruction from a user, the user may be notified that retaking is not necessary.

If the average score is determined to be smaller than the threshold value th in step S47, on the other hand, the process moves on to step S48. In this case, the average score for the current determination target area is small, and the current determination target area is not in focus. Therefore, a photographed image should be retaken as necessary.

In step S48, the warning control unit 85 supplies the information indicating the location of the current determination target area to the processing unit 80 for display as necessary, and instructs the processing unit 80 for display to display a warning.

In step S49, the processing unit 80 for display generates an image and a text message for displaying a warning such as a warning icon in accordance with the instruction from the warning control unit 85, and then supplies the image and the text message to the display unit 26, which then displays the image and the text message as a warning. The display unit 26 displays the warning in accordance with the image and the like supplied from the processing unit 80 for display.

As a result, a warning icon and a text message superimposed on the photographed image are displayed as shown in FIGS. 4 and 5. After the warning is displayed, the warning process comes to an end.

As described above, the imaging apparatus 11 calculates an average score indicating the degree of focus near the area to be brought into focus in a photographed image obtained by photographing, and displays a warning in accordance with the average score.

A check is made to determine whether the degree of focus of the photographed image is sufficient from the photographed image obtained by photographing as described above, and a warning is displayed in accordance with the results of the determination. With the warning, the user can be prompted to check the degree of focus, regardless of whether defocusing has been caused by camera shake or been optically caused. Thus, the user can more easily and intuitively recognize the degree of focus of an image obtained by photographing.

Even if the screen for displaying a photographed image is too small for the user to notice defocusing or blurring in the image, the user can determine whether retaking is necessary immediately after photographing. Thus, missing a chance to take an image can be prevented.

First Modification of the First Embodiment

<Description of a Warning Process>

In the above described first embodiment, the focus area determining process is performed on an entire photographed image. However, the focus area determining process may be performed only on the current determination target area.

Figure 8:
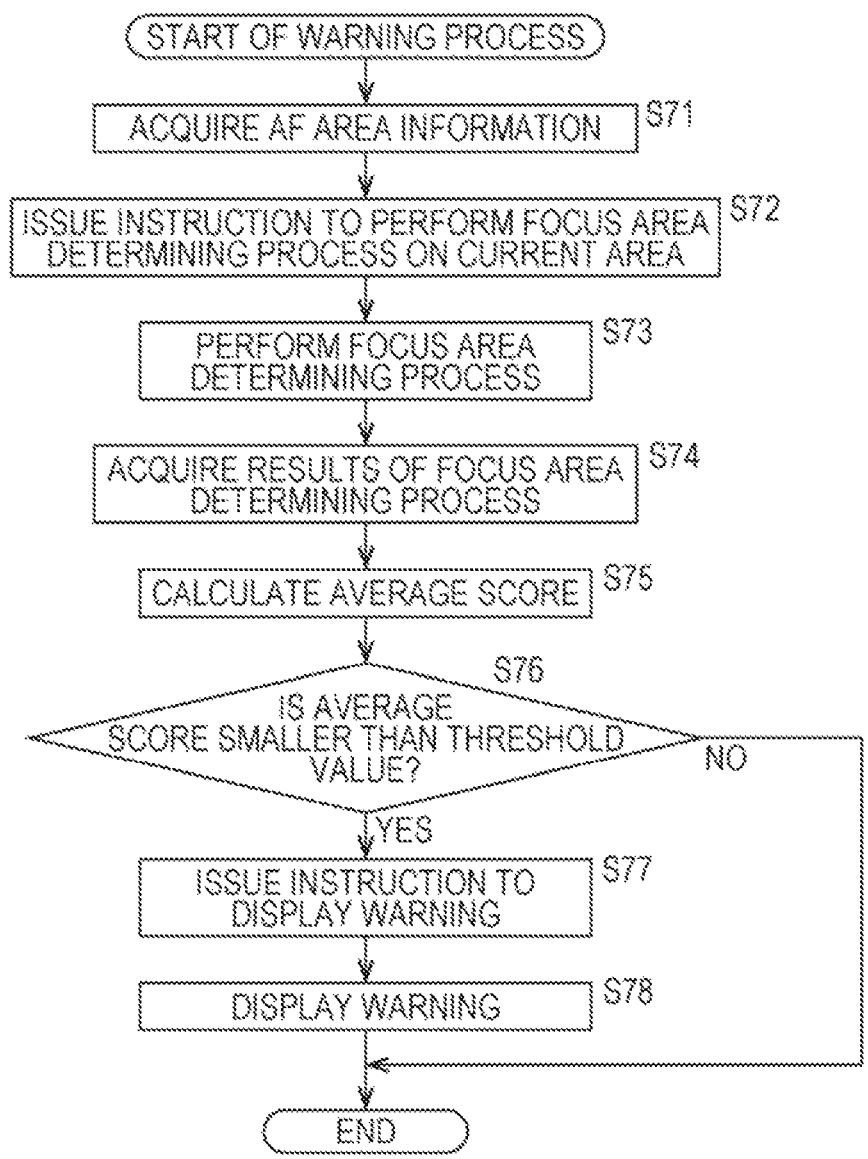
FIG. 8 is a flowchart for explaining a warning process.

In such a case, the warning process shown in FIG. 8 is performed after the photographing process described above with reference to FIG. 6 is performed. Referring to the flowchart in FIG. 8, a warning process to be performed by the imaging apparatus 11 is described below.

Figure 7:
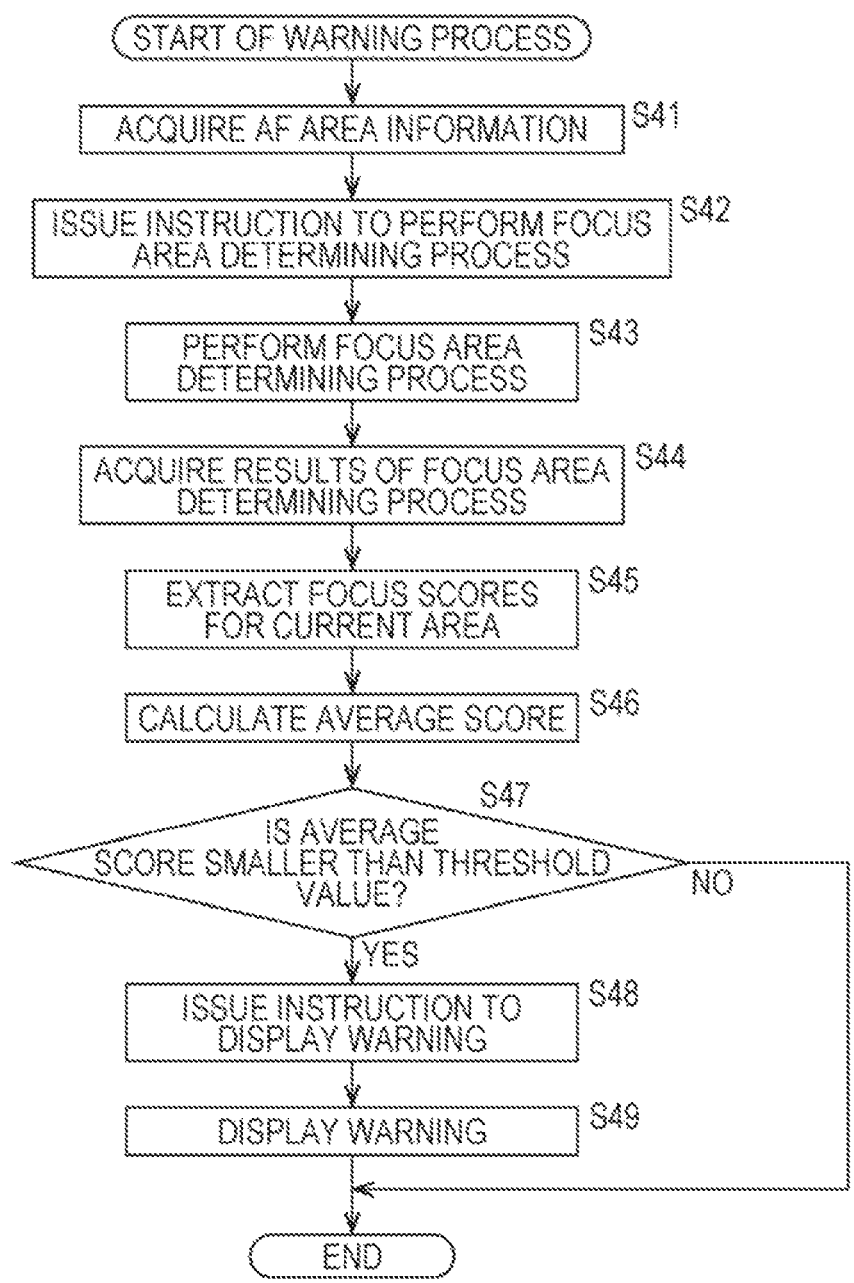
FIG. 7 is a flowchart for explaining a warning process.

The procedure in step S71 is the same as the procedure in step S41 in FIG. 7, and therefore, explanation thereof is not repeated herein.

In step S72, the warning control unit 85 supplies information indicating the current determination target area defined by the AF area information to the focus area determining unit 77, and instructs the focus area determining unit 77 to perform a focus area determining process only on the current determination target area.

In step S73, in accordance with the instruction from the warning control unit 85, the focus area determining unit 77 reads the current determination target area in the photographed image from the memory 79, and performs a focus area determining process. As a result, focus scores for the (M'×N') areas constituting the current determination target area are obtained.

In step S74, the warning control unit 85 obtains, from the focus area determining unit 77, the focus scores for the (M'×N') areas constituting the current determination target area as the results of the focus area determining process.

In step S75, the warning control unit 85 calculates an average score for the current determination target area in accordance with the focus scores for the (M'×N') areas constituting the current determination target area.

After the average score is calculated, the procedures in steps S76 through S78 are carried out, and the warning process then comes to an end. However, these procedures are the same as the procedures in steps S47 through S49 in FIG. 7, and therefore, explanation of them is not repeated herein.

In the above manner, the imaging apparatus 11 performs the focus area determining process only on the current determination target area in a photographed image, calculates an average score for the current determination target area, and displays a warning in accordance with the average score.

As a warning is displayed in accordance with the average score for the current determination target area, the user can be prompted to check the degree of focus, regardless of whether defocusing has been caused by camera shake or been optically caused. Thus, the user can more easily and intuitively recognize the degree of focus of an image obtained by photographing.

Also, as the focus area determining process is performed only on the current determination target area, the time required for the focus area determining process can be made shorter than that in the example case described with reference to FIG. 7. Furthermore, as fewer zones (areas) of the photographed image need to be read from the memory 79, processing can be performed more quickly, and power consumption can be reduced.

Second Embodiment

<Outline of Processing to be Performed by an Imaging Apparatus>

In the above described case, the current determination target area is defined by AF area information. However, an area (a position) having a degree of focus to be checked by the user may be designated as the current determination target area.

Figure 9:
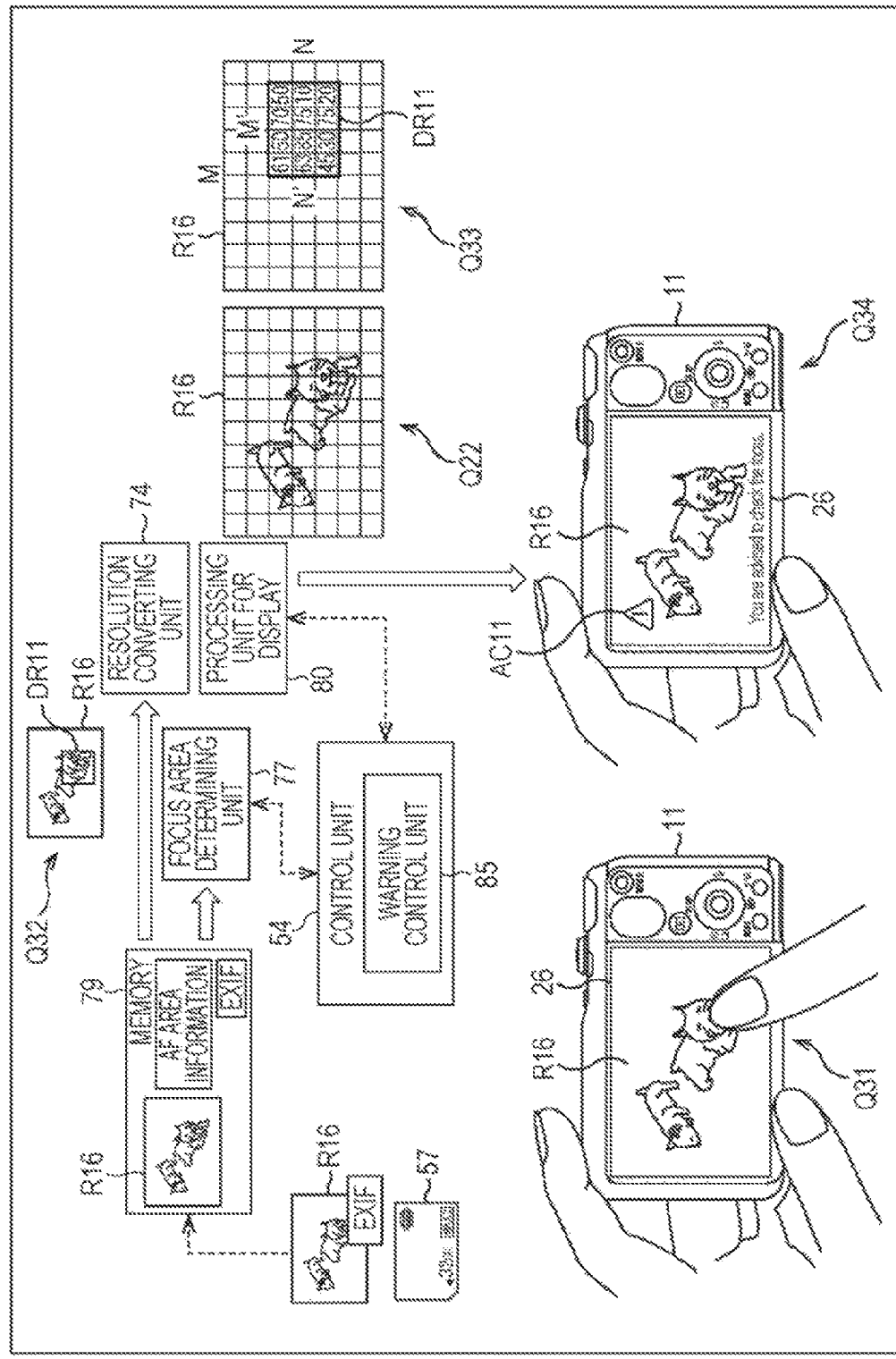
FIG. 9 is a diagram for explaining a warning process.

In such a case, the warning process shown in FIG. 9, for example, is performed after the photographing process described above with reference to FIG. 3 is performed. In FIG. 9, the components equivalent to those shown in FIG. 4 are denoted by the same reference numerals as those used in FIG. 4, and explanation of them will not be unnecessarily repeated.

When a warning process is started, the photographed image R16 as the current target shown in an upper left portion in the drawing is first read from the recording unit 57 as necessary, and is then supplied to the memory 79. If the warning process is performed immediately after photographing, the photographed image R16 is already stored in the memory 79, and therefore, loading of the photographed image R16 is not necessary. In this case, the AF area information and the EXIF data are stored in the memory 79.

While the photographed image R16 is displayed as a preview image, the user operates the user interface 53 as indicated by an arrow Q31, to designate an area to be checked for its degree of focus (the area will be hereinafter also referred to as the designated area).

In this example, the user directly touches the touch panel that is placed on the display unit 26 and serves as the user interface 53, and thus designates, in the photographed image R16, the designated area that is the position to be checked for its degree of focus. The designated area may be designated by the user operating a dial or the like serving as the user interface 53, or an area of a predetermined size in the photographed image R16 may be designated.

After the designated area is designated by the user as above, the warning control unit 85 sets a current determination target area DR11 based on the designated area, as indicated by an arrow Q32, and instructs the focus area determining unit 77 to perform a focus area determining process only on the current determination target area DR11. The current determination target area DR11 is an area that has the designated area at its center, and includes the entire designated area.

In accordance with the instruction from the warning control unit 85, the focus area determining unit 77 reads the current determination target area DR11 of the photographed image R16 from the memory 79, and performs a focus area determining process.

In the focus area determining process, the photographed image R16 is divided into (M×N) areas, for example, as indicated by an arrow Q22. Only the current determination target area DR11 among the (M×N) areas is selected as the current processing target, as indicated by an arrow Q33. Focus scores for the (M'×N') areas constituting the current determination target area DR11 are calculated, and are then supplied to the warning control unit 85.

The warning control unit 85 calculates an average score in accordance with the focus scores for the respective areas in the current determination target area DR11 supplied from the focus area determining unit 77. If the average score is smaller than a threshold value th, the warning control unit 85 instructs the processing unit 80 for display to display a warning.

In accordance with the instruction from the warning control unit 85, the processing unit 80 for display superimposes information indicating a warning about the degree of focus on the photographed image R16 subjected to resolution conversion performed by the resolution converting unit 74 as appropriate, and then causes the display unit 26 to display the superimposed image.

As a result, a warning icon AC11 superimposed on the photographed image R16 is displayed, and a warning text message, "You are advised to check the focus.", is also displayed, as indicated by an arrow Q34, for example. As the warning icon AC11 and the text message are displayed, the user can easily and intuitively determine whether to check the degree of focus.

In the example shown in FIG. 9, the warning icon AC11 is displayed in an upper left portion on the display screen in the drawing, and the text message is displayed in a lower portion on the display screen in the drawing.

The warning icon AC11 is not necessarily displayed in the upper left portion, and may be displayed in any other portion on the display screen. For example, the warning icon AC11 may be displayed near the current determination target area DR11, as in the example shown in FIG. 5.

<Description of a Warning Process>

Next, the procedures in the warning process shown in FIG. 9 are described in greater detail. Referring to the flowchart in FIG. 10, a warning process to be performed by the imaging apparatus 11 is described below.

In step S101, the warning control unit 85 acquires the information indicating the designated area from the user interface 53.

For example, the user designates the designated area by touching the touch panel serving as the user interface 53, or designates the designated area by operating a dial or the like serving as the user interface 53. The warning control unit 85 acquires information that is output from the user interface 53 in accordance with an operation performed by the user, as the information indicating the designated area.

In step S102, the warning control unit 85 supplies information indicating the current determination target area defined by the designated area to the focus area determining unit 77, and instructs the focus area determining unit 77 to perform a focus area determining process only on the current determination target area. For example, the current determination target area is an area that has the designated area at its center and is of a predetermined size.

In step S103, in accordance with the instruction from the warning control unit 85, the focus area determining unit 77 reads the current determination target area in the photographed image from the memory 79, and performs a focus area determining process. As a result, focus scores for the (M'×N') areas constituting the current determination target area are obtained.

In step S104, the warning control unit 85 obtains, from the focus area determining unit 77, the focus scores for the (M'×N') areas constituting the current determination target area as the results of the focus area determining process.

In step S105, the warning control unit 85 calculates an average score for the current determination target area in accordance with the focus scores for the (M'×N') areas constituting the current determination target area.

After the average score is calculated, the procedures in steps S106 through S108 are carried out, and the warning process then comes to an end. However, these procedures are the same as the procedures in steps S47 through S49 in FIG. 7, and therefore, explanation of them is not repeated herein.

In the above manner, the imaging apparatus 11 performs the focus area determining process only on the current determination target area including the area designated by the user, calculates an average score for the current determination target area, and displays a warning in accordance with the average score.

As a warning is displayed in accordance with the average score for the current determination target area, the user can be prompted to check the degree of focus, regardless of whether defocusing has been caused by camera shake or been optically caused. Thus, the user can more easily and intuitively recognize the degree of focus of an image obtained by photographing.

Particularly, as only the current determination target area including the area designated by the user is selected as the current processing target, processing can be performed more quickly, and power consumption can be reduced. Also, the user can accurately check the degree of focus of the desired area.

Third Embodiment

<Outline of Processing to be Performed by the Imaging Apparatus>

When a photographed image of the face of a person as the object is taken, the user brings the face of the person into focus, and after the photographing, the user must wish to check the degree of focus of the face portion. In view of this, a face area may be detected from a photographed image, and the face area may be designated as the current determination target area to be subjected to a focus area determining process.

Figure 11:
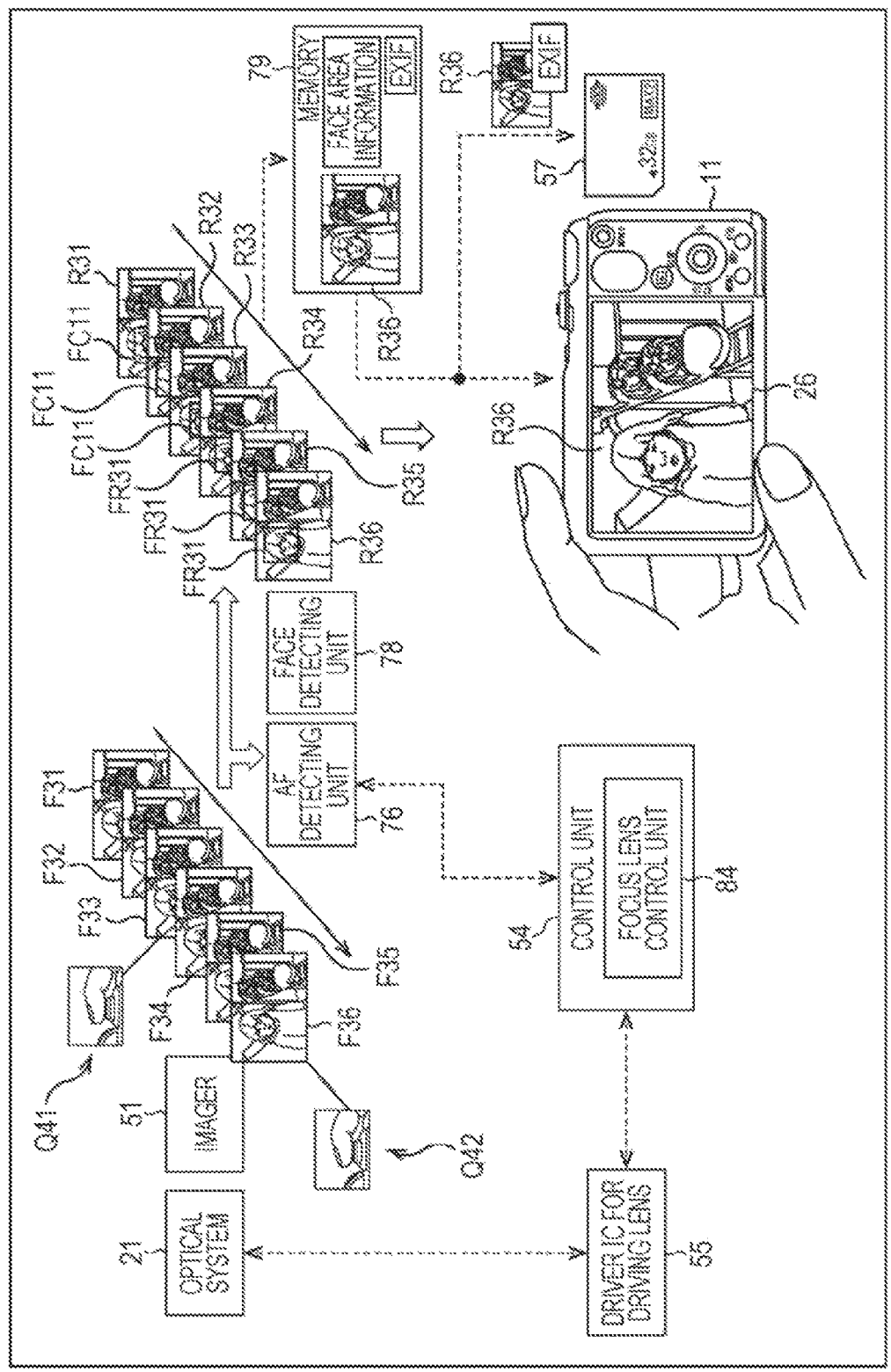
FIG. 11 is a diagram for explaining a photographing process.
Figure 12:
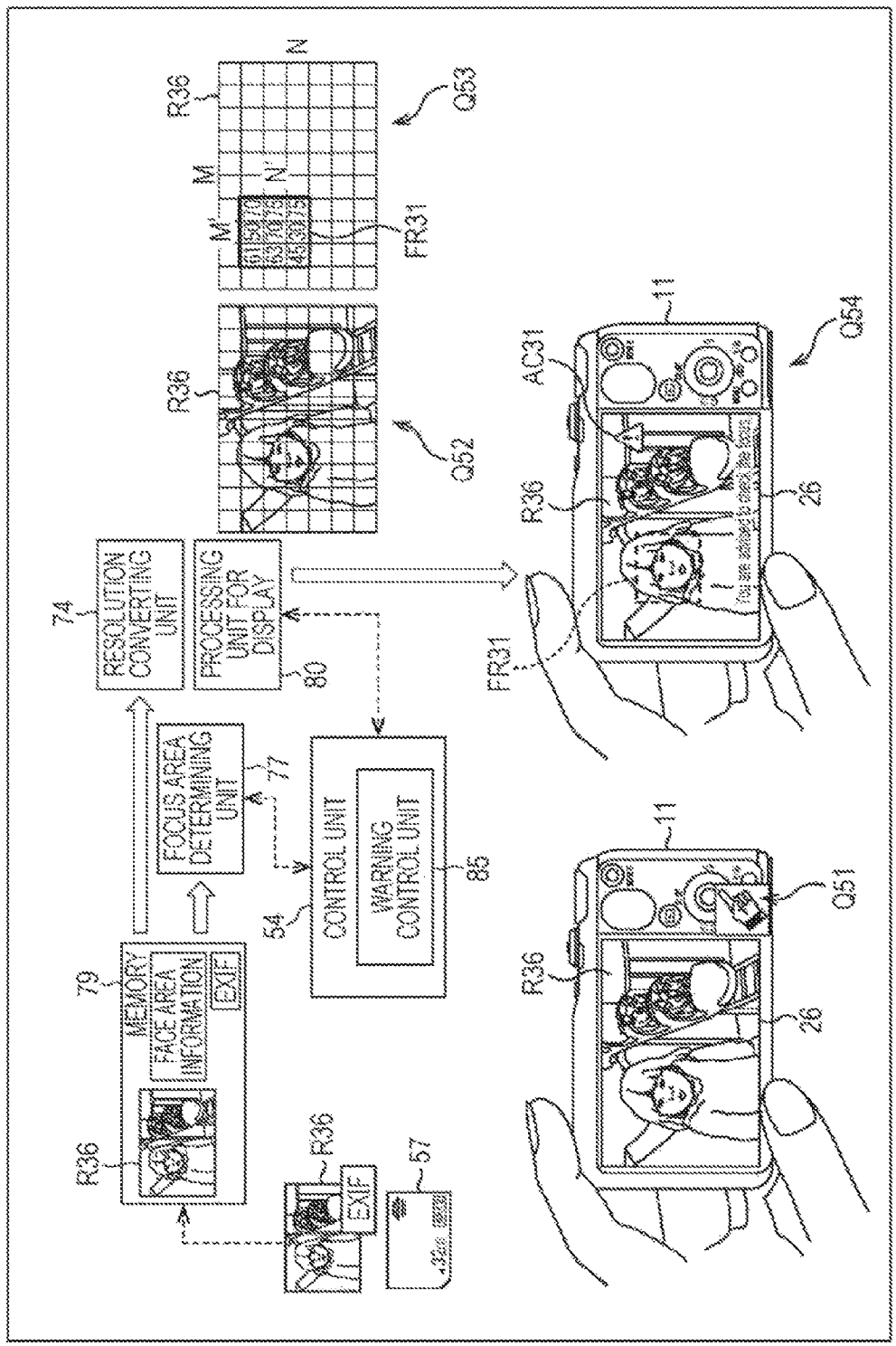
FIG. 12 is a diagram for explaining a warning process.

In such a case, the photographing process shown in FIG. 11 and the warning process shown in FIG. 12 are performed, for example.

As shown in FIG. 11, when a photographing operation is started, the imager 51 receives light entering via the optical system 21, and performs photoelectric conversion. As a result, photographed images F31 through F36 of the respective frames are obtained. Of the photographed images F31 through F36, an image closer to the front side in the drawing is a newer image, or is an image taken at a time closer to the current time.

When such photographed images of the respective frames are taken, the face detecting unit 78 detects the face area of a person from the photographed images. Also, the AF detecting unit 76 calculates the evaluation value indicating an autofocus status based on the photographed images of the respective frames, and supplies the evaluation value to the control unit 54. The focus lens control unit 84 of the control unit 54 controls the lens driver IC 55 in accordance with the evaluation value supplied from the AF detecting unit 76, and causes the lens driver IC 55 to perform a focusing operation.

With this, the focus lens and the like of the optical system 21 are driven by the lens driver IC 55, to focus on the object. Particularly, when a face area is detected from the photographed images, the focusing operation is performed to focus on the face area.

After the photographed images F31 through F36 of the respective frames are obtained, processing is performed on these photographed images, and the resultant photographed images R31 through R36 are sequentially displayed, as through-the-lens images at the time of photographing, on the display unit 26.

The user checks the object by looking at the through-the-lens image displayed on the display unit 26, and performs photographing by operating the shutter button 22 and the like.

In this example, a face area is detected from the photographed images F31 through F33, a frame FC11 indicating the detected face area is displayed on the photographed images R31 through R33 obtained by processing those photographed images.

Further, when the user presses the shutter button 22 halfway to extract the photographed image F33 as indicated by an arrow Q41, an autofocus target frame FR31 is displayed on the photographed images R34 through R36 of the frames that follow. In this example, the area of the frame FC11 indicating the face area becomes the target frame FR31.

When determining that the object in the frame FR31 has been brought into focus, the user presses the shutter button 22 completely, to issue an instruction to take an image.

In this example, as shown in an arrow Q42, the shutter button 22 is pressed completely when the photographed image F36 is extracted. As a result, the photographed image R36 obtained by processing the photographed image F36 is captured as the image obtained by photographing.

The photographed image R36 obtained in this manner is stored into the memory 79 as shown in the right side in the drawing. The photographed image R36 is then recorded into the recording unit 57, and is displayed, as a preview image after the photographing, on the display unit 26.

In the imaging apparatus 11, at the same time as the storing of the photographed image R36 into the memory 79, information indicating the face area brought into focus in the autofocusing at the time when the photographed image F36 was taken is also stored as face area information into the memory 79.

Further, in the example shown in FIG. 11, the memory 79 stores not only the face area information but also EXIF data containing the face area information. The EXIF data is the data to be attached as metadata to the photographed image R36, and the face area information is recorded into a free area of the EXIF data, for example. If any face is not detected from the photographed images, face area information is not recorded.

After the photographed image R36, the face area information, and the EXIF data are stored into the memory 79 in the above manner, the EXIF data is attached to the photographed image R36, and the photographed image R36 accompanied by the EXIF data is recorded into the recording unit 57. The photographed image R36 is also displayed, as the preview image after the photographing, on the display unit 26.

While the photographed image R36 is displayed as the preview image, the user further operates the user interface 53 to issue an instruction to check the degree of focus, for example, as indicated by an arrow Q51 in a lower left portion in FIG. 12.

The imaging apparatus 11 then checks whether the degree of focus of the photographed image R36 is sufficient, and conducts a warning process to issue a warning as necessary. Alternatively, the warning process may be automatically started as described above.

When the warning process is started, the photographed image R36 is first read from the recording unit 57 as necessary, and is then supplied to the memory 79. If the warning process is performed immediately after photographing, the photographed image R36 is already stored in the memory 79, and therefore, loading of the photographed image R36 is not necessary. In this case, the face area information and the EXIF data are stored in the memory 79.

The warning control unit 85 then instructs the focus area determining unit 77 to perform a focus area determining process only on the frame FR31 in the photographed image R36, the frame FR31 being the face area indicated by the face area information stored in the memory 79.

The focus area determining unit 77 in turn reads the face area in the photographed image R36 from the memory 79, and performs a focus area determining process on the face area.

In the focus area determining process, the photographed image R36 is divided into (M×N) areas, for example, as indicated by an arrow Q52. Only the area of the frame FR31 that is the face area among the (M×N) areas is selected as the current processing target, as indicated by an arrow Q53. Focus scores for the (M'×N') areas constituting the area of the frame FR31 are calculated, and are then supplied to the warning control unit 85.

The warning control unit 85 calculates an average score in accordance with the focus scores for the respective areas in the face area supplied from the focus area determining unit 77. If the average score is smaller than a threshold value th, the warning control unit 85 instructs the processing unit 80 for display to display a warning.

In accordance with the instruction from the warning control unit 85, the processing unit 80 for display superimposes information indicating a warning about the degree of focus on the photographed image R36 subjected to resolution conversion performed by the resolution converting unit 74 as appropriate, and then causes the display unit 26 to display the superimposed image.

As a result, a warning icon AC31 superimposed on the photographed image R36 is displayed, and a warning text message, "You are advised to check the focus.", is also displayed, as indicated by an arrow Q54, for example. As the warning icon AC31 and the text message are displayed, the user can easily and intuitively determine whether to check the degree of focus.

In the example shown in FIG. 12, the warning icon AC31 is displayed in an upper right portion on the display screen in the drawing, and the text message is displayed in a lower portion on the display screen in the drawing. The frame FR31 indicating the face area is also displayed on the photographed image R36.

Figure 13:
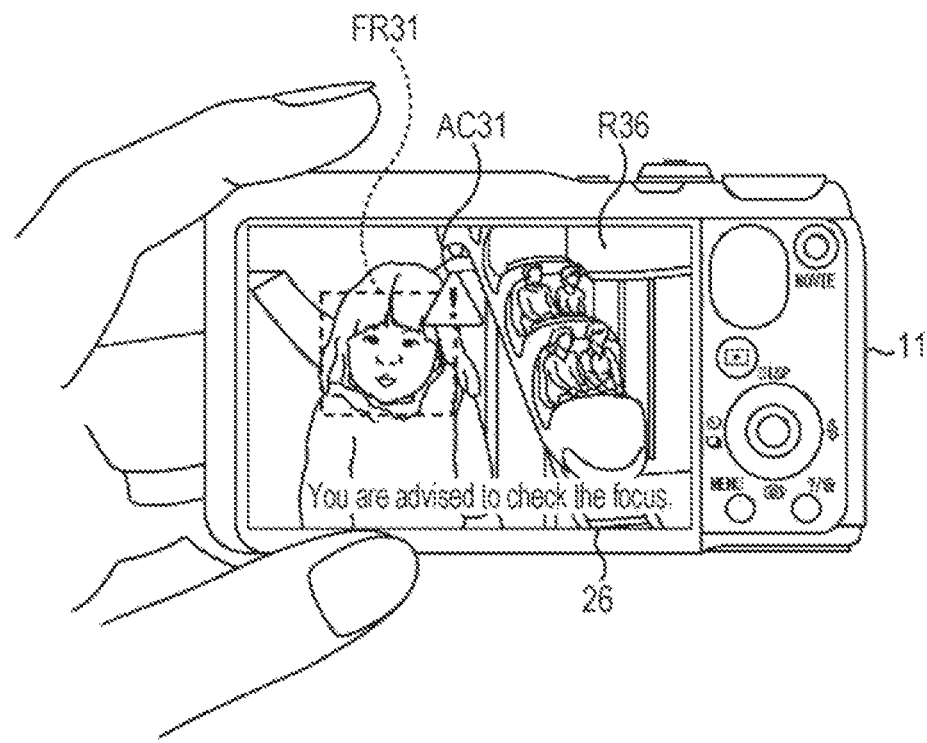
FIG. 13 is a diagram showing another example of display of a warning.

The warning icon AC31 is not necessarily displayed in the upper right portion, and may be displayed in any other portion on the display screen. For example, the warning icon AC31 may be displayed near the face area, as shown in FIG. 13. In that case, the user can easily and intuitively determine which portion of the photographed image R36 is out of focus. Furthermore, the warning icon AC31 does not hide the face. In FIG. 13, the components equivalent to those shown in FIG. 12 are denoted by the same reference numerals as those used in FIG. 12, and explanation of them is not repeated herein.

<Description of a Photographing Process>

Next, specific operations to be conducted by the imaging apparatus 11 when processing is performed as described above with reference to FIGS. 11 and 12 are described.

Figure 14:
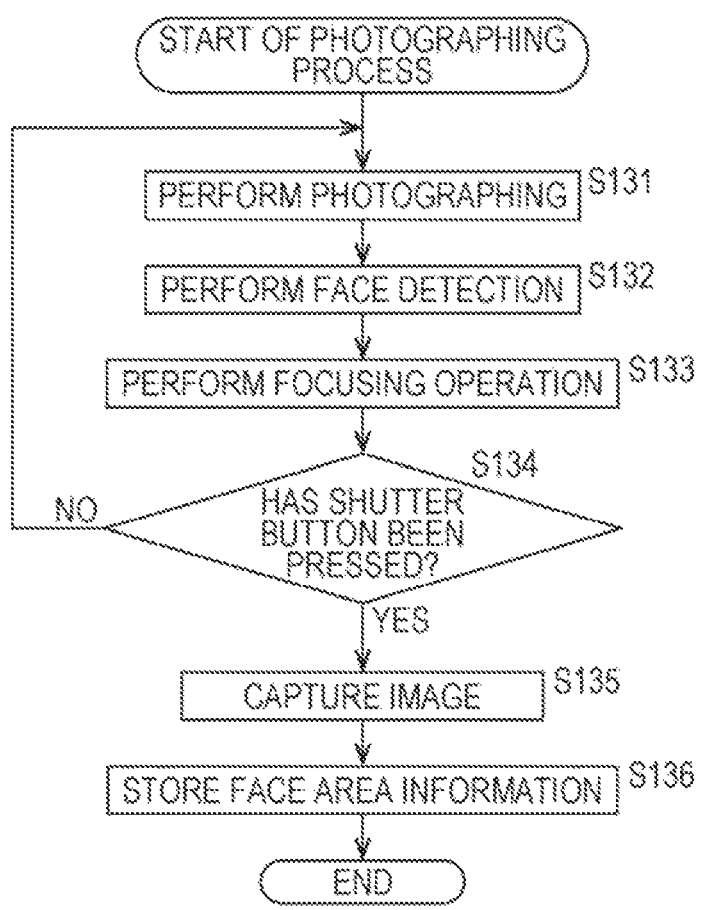
FIG. 14 is a flowchart for explaining a photographing process.

Referring first to the flowchart in FIG. 14, a photographing process to be performed by the imaging apparatus 11 is described. The procedure in step S131 is the same as the procedure in step S11 in FIG. 6, and therefore, explanation thereof is not repeated herein.

In step S132, the face detecting unit 78 performs face detection on a photographed image obtained by photographing, and detects the face area of a person. In the face detection, the face area is detected in accordance with feature quantities extracted from the photographed image. The face detecting unit 78 supplies the result of the face area detection to the control unit 54.

In step S133, the focus lens control unit 84 controls the lens driver IC 55 in accordance with the evaluation value supplied from the AF detecting unit 76, and causes the lens driver IC 55 to perform a focusing operation. At this point, the face area detected from the photographed image is the area to be brought into focus, for example.

After the focusing operation is performed, the procedures in steps S134 and S135 are carried out, and the photographed image is captured. However, these procedures are the same as the procedures in steps S13 and S14 in FIG. 6, and therefore, explanation of them is not repeated herein.

In step S136, the focus lens control unit 84 supplies and stores the face area information indicating the face area detected by the face detecting unit 78 into the digital signal processing LSI 52.

The digital signal processing LSI 52 supplies the face area information supplied from the focus lens control unit 84 to the memory 79, and causes the memory 79 to store the face area information associated with the photographed image. The face area information may be incorporated into the EXIF data as necessary, and the EXIF data may be stored into the memory 79. The EXIF data containing the face area information may be attached to the photographed image.

As the face area information is stored, the photographing process comes to an end. If any face area is not detected from any photographed image, face area information is not recorded.

After the photographed image is obtained in the above manner, the obtained photographed image is displayed as a preview image on the display unit 26. The photographed image is also encoded by the CODEC 75 in an appropriate manner and is recorded into the recording unit 57 at an appropriate time.

<Description of a Warning Process> warning process is started in a case where the user issues an instruction for warning display by operating the user interface 53 while a preview image is displayed, or in a case where a preview image is displayed for a predetermined period of time in a setting where the warning process is to start automatically, for example. Referring to the flowchart in FIG. 15, a warning process to be performed by the imaging apparatus 11 is described below.

In step S161, the warning control unit 85 acquires the face area information from the memory 79. Alternatively, the face area information may be read from the EXIF data attached to the photographed image stored in the memory 79.

In step S162, the warning control unit 85 determines whether a face has been detected at the time when the photographed image was taken. For example, if the face area information is stored in the memory 79 or is contained in the EXIF data, it is determined that a face has been detected.

If it is determined in step S162 that any face has not been detected, the degree of focus on the face portion cannot be determined, and therefore, the warning process comes to an end.

If it is determined in step S162 that a face has been detected, on the other hand, the warning control unit 85 in step S163 supplies the face area information to the focus area determining unit 77, and instructs the focus area determining unit 77 to perform a focus area determining process only on the face area.

In step S164, in accordance with the instruction from the warning control unit 85, the focus area determining unit 77 reads the face area in the photographed image from the memory 79, and performs a focus area determining process. As a result, focus scores for the (M'×N') areas constituting the face area are obtained.

In step S165, the warning control unit 85 obtains, from the focus area determining unit 77, the focus scores for the (M'×N') areas constituting the face area as the results of the focus area determining process.

In step S166, the warning control unit 85 calculates an average score for the face area in accordance with the focus scores for the (M'×N') areas constituting the face area.

After the average score is calculated, the procedures in steps S167 through S169 are carried out, and the warning process then comes to an end. However, these procedures are the same as the procedures in steps S47 through S49 in FIG. 7, and therefore, explanation of them is not repeated herein.

In the above manner, the imaging apparatus 11 performs the focus area determining process only on the face area in a photographed image, calculates an average score for the face area, and displays a warning in accordance with the average score.

As a warning is displayed in accordance with the average score for the face area, the user can be prompted to check the degree of focus, regardless of whether defocusing has been caused by camera shake or been optically caused. Thus, the user can more easily and intuitively recognize the degree of focus of an image obtained by photographing.

Also, as the focus area determining process is performed only on the face area, the time required for the focus area determining process can be made even shorter, and power consumption can be reduced.

Fourth Embodiment

<Description of Warning Processes>

In the above described embodiments, displaying a warning has been described as a method of issuing a warning to the user. However, a warning to the user may be issued by outputting a warning sound.

In such cases, the processes shown in FIGS. 16 through 19 are performed as the processes corresponding to the respective warning processes described above with reference to FIGS. 7, 8, 10, and 15. Referring to the flowcharts in FIGS. 16 through 19, warning processes with a warning sound will be described below.

Figure 16:
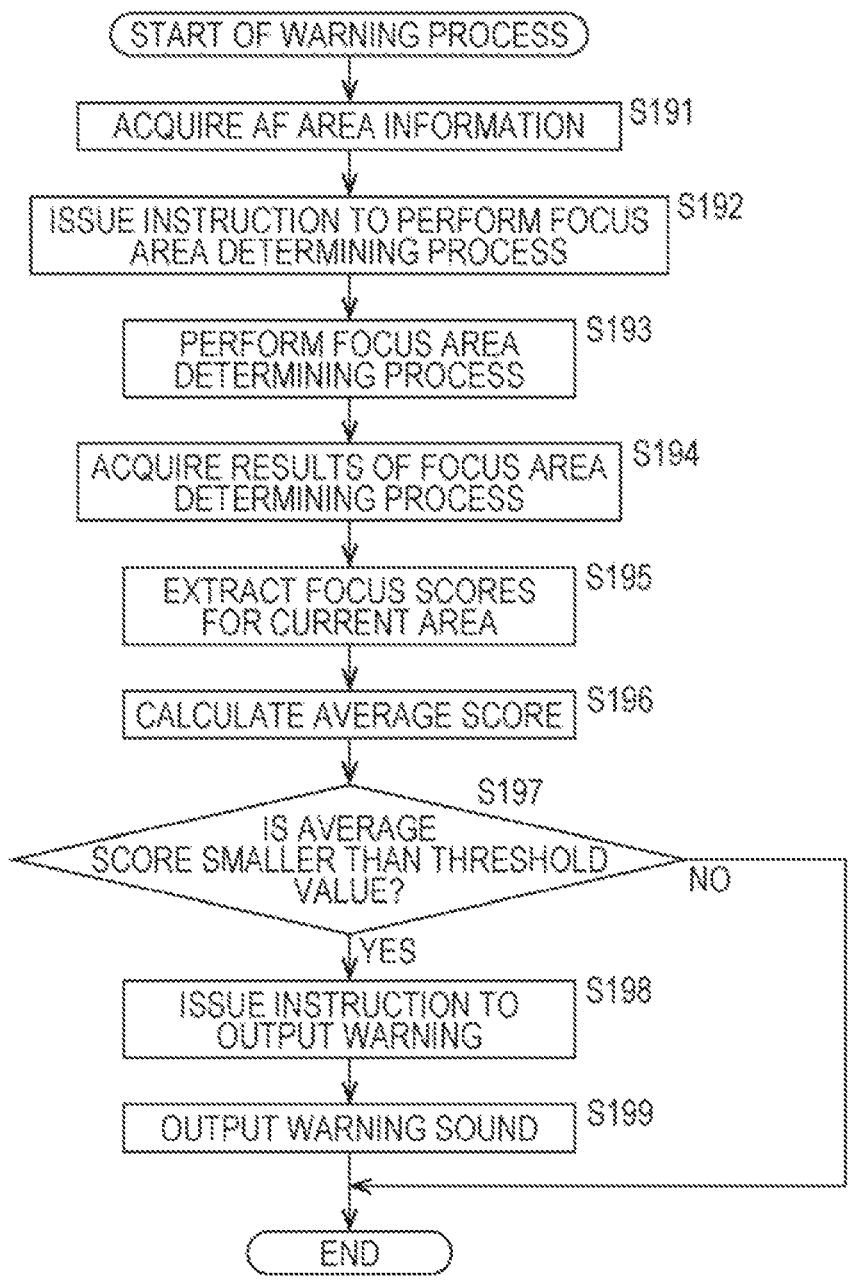
FIG. 16 is a flowchart for explaining a warning process.

Referring first to the flowchart in FIG. 16, the warning process corresponding to the warning process shown in FIG. 7 is described. The procedures in steps S191 through S197 are the same as the procedures in steps S41 through S47 in FIG. 7, and therefore, explanation of them is not repeated herein.

In step S198, the warning control unit 85 instructs the speaker driving unit 82 to issue a warning.

In step S199, the speaker driving unit 82 supplies an audio signal for a warning sound to the speaker 59 in accordance with the instruction from the warning control unit 85, and causes the speaker 59 to output the warning sound. The speaker 59 issues a warning by reproducing the warning sound in accordance with the audio signal supplied from the speaker driving unit 82, and the warning process then comes to an end.

The warning sound may be an audio message or a sound in a predetermined pattern.

In the above manner, the imaging apparatus 11 issues a warning in the form of a warning sound to prompt a check on the degree of focus. With this, the user can easily and intuitively recognize a need for a check on the degree of focus, even when not looking at the display unit 26.

Figure 17:
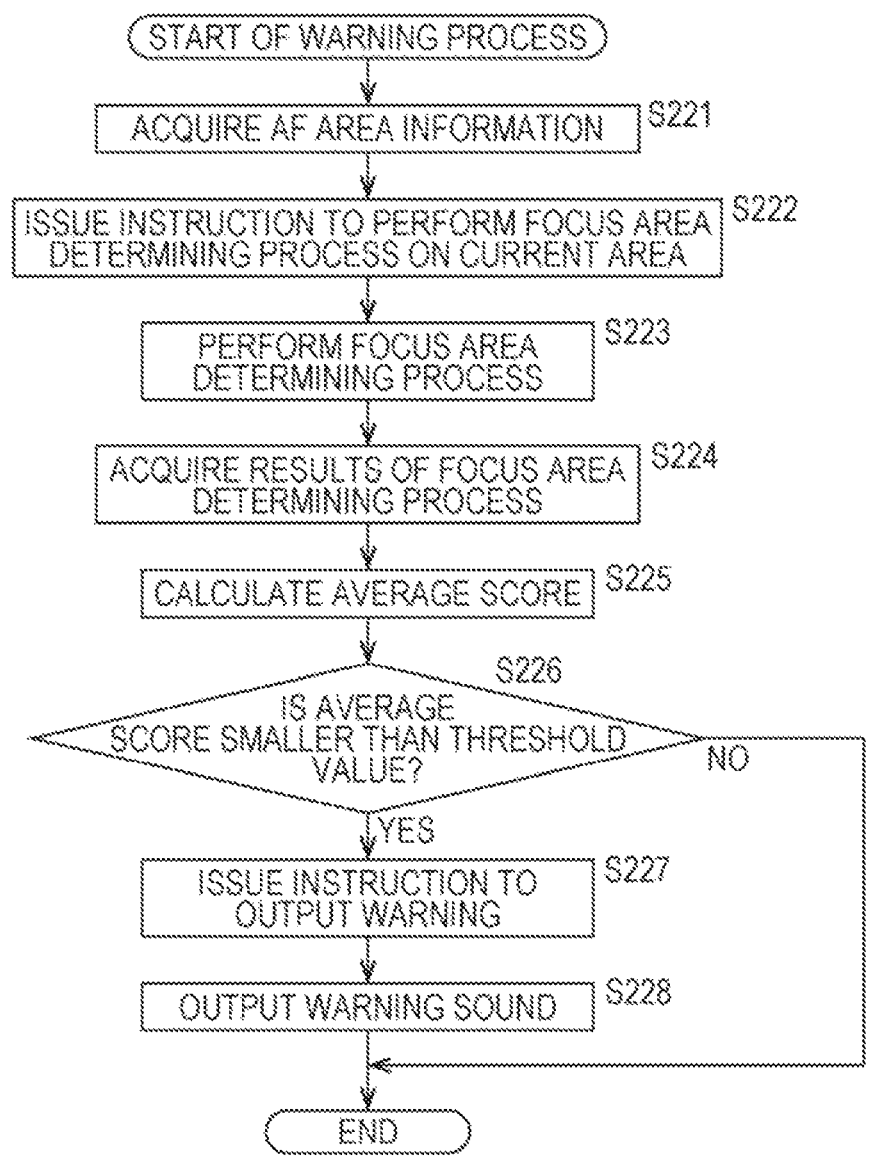
FIG. 17 is a flowchart for explaining a warning process.

Referring now to the flowchart in FIG. 17, the warning process corresponding to the warning process shown in FIG. 8 is described. The procedures in steps S221 through S226 are the same as the procedures in steps S71 through S76 in FIG. 8, and therefore, explanation of them is not repeated herein.

In step S227, the warning control unit 85 instructs the speaker driving unit 82 to issue a warning. In step S228, the speaker driving unit 82 supplies an audio signal for a warning sound to the speaker 59 in accordance with the instruction from the warning control unit 85, and causes the speaker 59 to output the warning sound. The speaker 59 issues a warning by reproducing the warning sound in accordance with the audio signal from the speaker driving unit 82, and the warning process then comes to an end.

In the above manner, the imaging apparatus 11 issues a warning in the form of a warning sound to prompt a check on the degree of focus. With this, the user can easily and intuitively recognize a need for a check on the degree of focus, even when not looking at the display unit 26.

Figure 10:
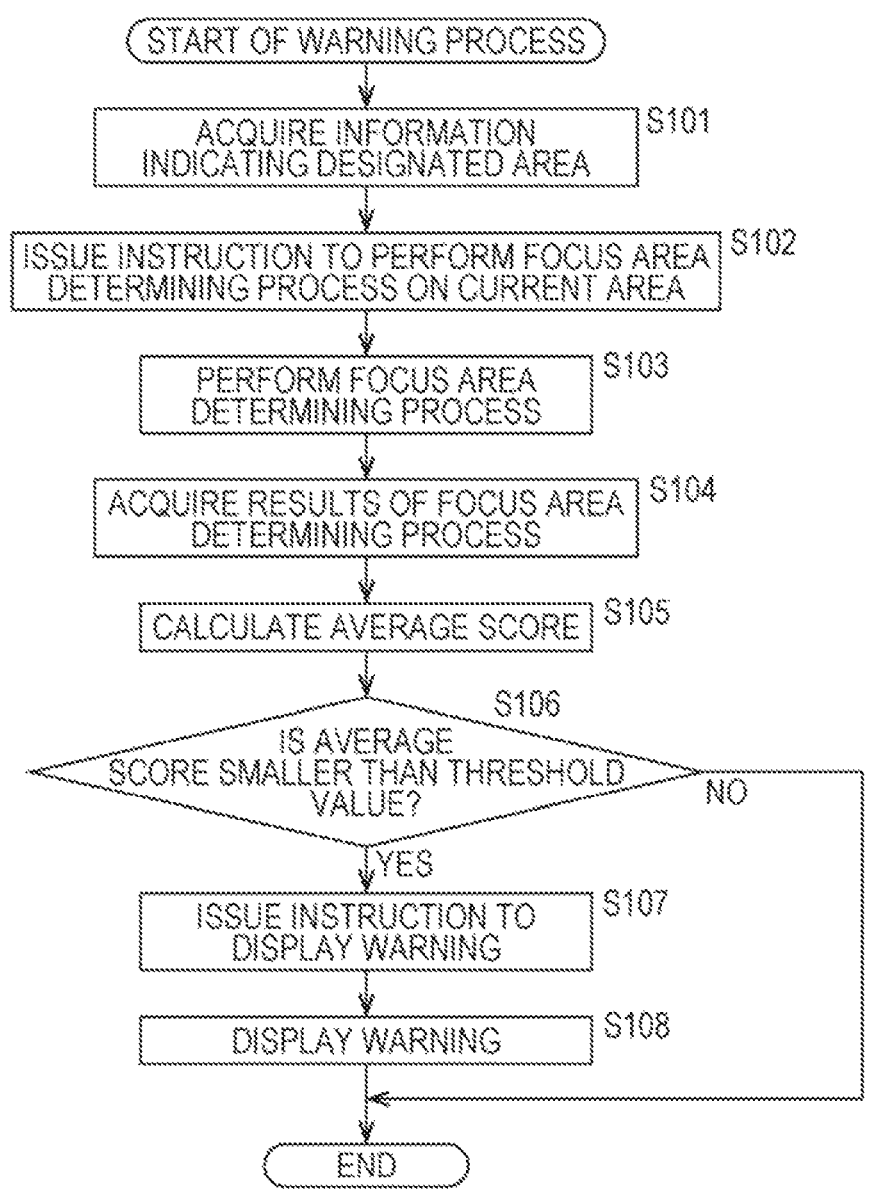
FIG. 10 is a flowchart for explaining a warning process.
Figure 18:
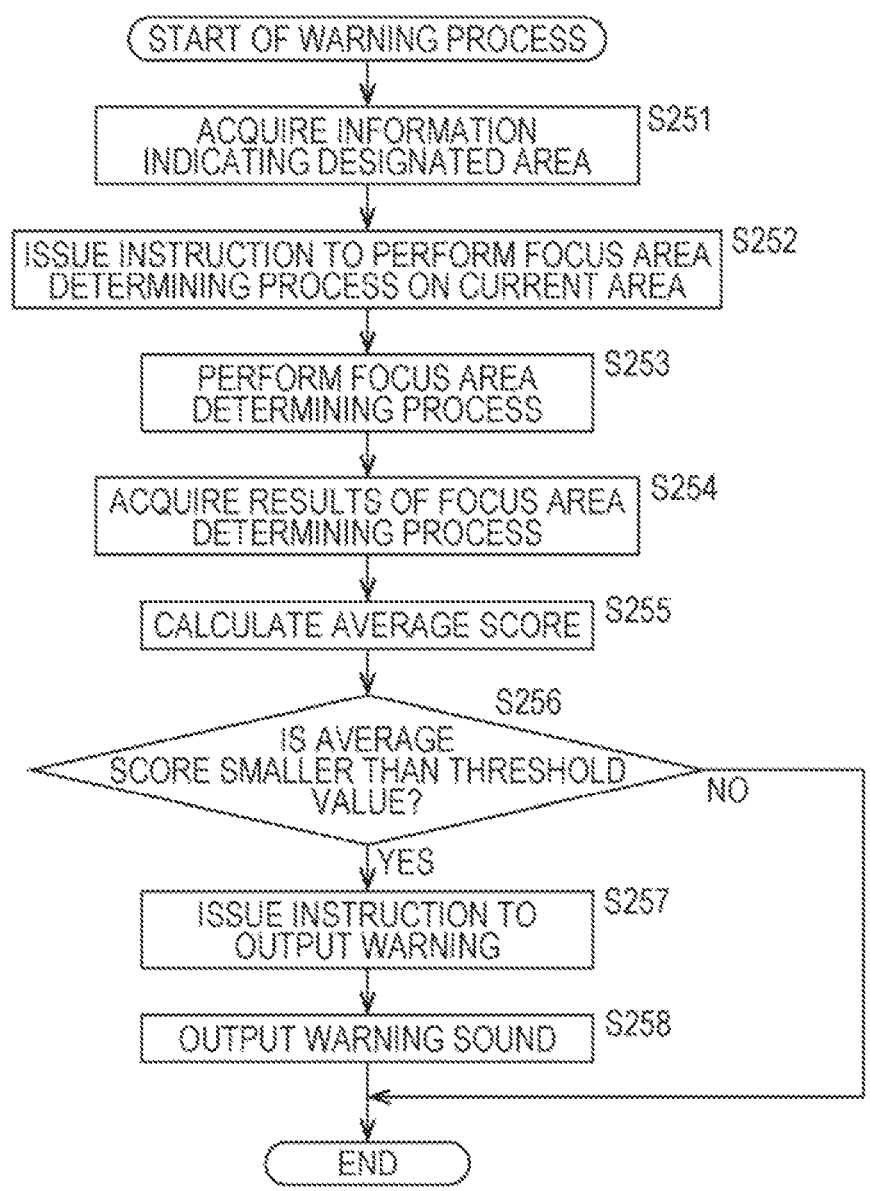
FIG. 18 is a flowchart for explaining a warning process.

Referring now to the flowchart in FIG. 18, the warning process corresponding to the warning process shown in FIG. 10 is described. The procedures in steps S251 through S256 are the same as the procedures in steps S101 through S106 in FIG. 10, and therefore, explanation of them is not repeated herein.

In step S257, the warning control unit 85 instructs the speaker driving unit 82 to issue a warning. In step S258, the speaker driving unit 82 supplies an audio signal for a warning sound to the speaker 59 in accordance with the instruction from the warning control unit 85, and causes the speaker 59 to output the warning sound. The speaker 59 issues a warning by reproducing the warning sound in accordance with the audio signal from the speaker driving unit 82, and the warning process then comes to an end.

In the above manner, the imaging apparatus 11 issues a warning in the form of a warning sound to prompt a check on the degree of focus. With this, the user can easily and intuitively recognize a need for a check on the degree of focus, even when not looking at the display unit 26.

Figure 15:
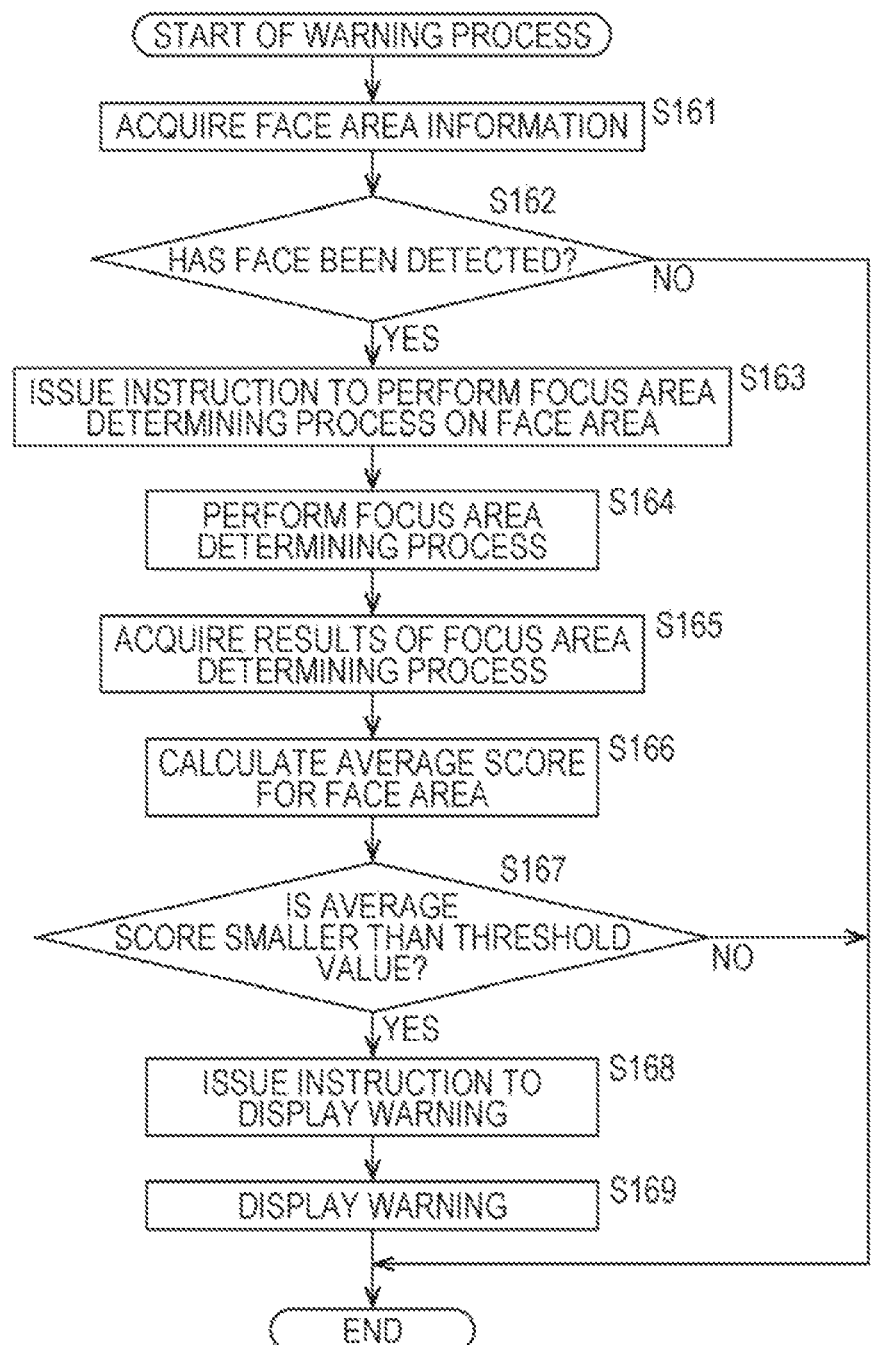
FIG. 15 is a flowchart for explaining a warning process.
Figure 19:
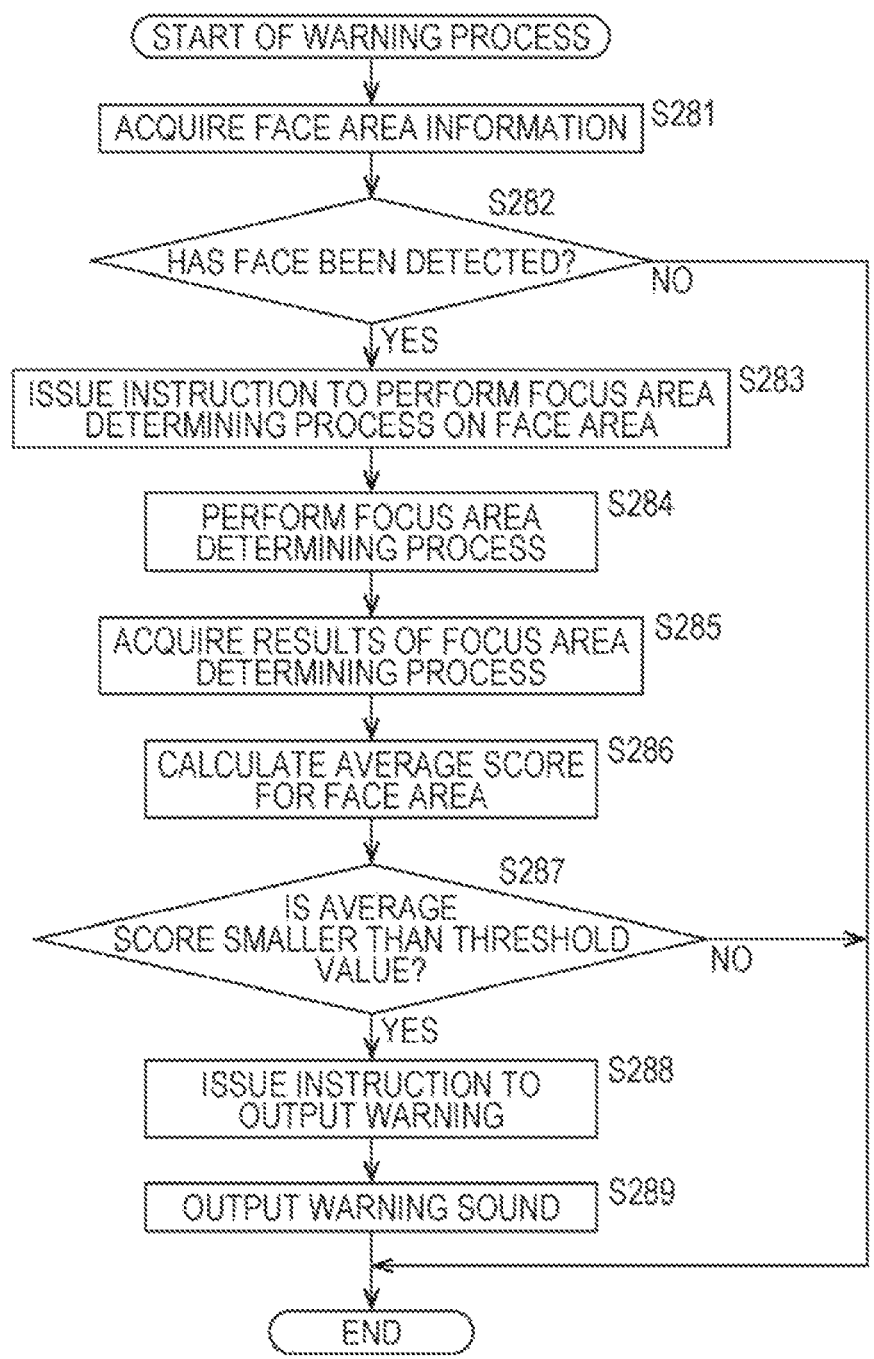
FIG. 19 is a flowchart for explaining a warning process.

Referring further to the flowchart in FIG. 19, the warning process corresponding to the warning process shown in FIG. 15 is described. The procedures in steps S281 through S287 are the same as the procedures in steps S161 through S167 in FIG. 15, and therefore, explanation of them is not repeated herein.

In step S288, the warning control unit 85 instructs the speaker driving unit 82 to issue a warning. In step S289, the speaker driving unit 82 supplies an audio signal for a warning sound to the speaker 59 in accordance with the instruction from the warning control unit 85, and causes the speaker 59 to output the warning sound. The speaker 59 issues a warning by reproducing the warning sound in accordance with the audio signal from the speaker driving unit 82, and the warning process then comes to an end.

In the above manner, the imaging apparatus 11 issues a warning in the form of a warning sound to prompt a check on the degree of focus. With this, the user can easily and intuitively recognize a need for a check on the degree of focus, even when not looking at the display unit 26.

Fifth Embodiment

<Description of a Warning Process>

In the above embodiment, issuing a warning with sound has been described as another method of issuing a warning to the user, but a warning to the user may be issued with light.

In such cases, the processes shown in FIGS. 20 through 23 are performed as the processes corresponding to the respective warning processes described above with reference to FIGS. 7, 8, 10, and 15. Referring to the flowcharts in FIGS. 20 through 23, warning processes by light emission will be described below.

Figure 20:
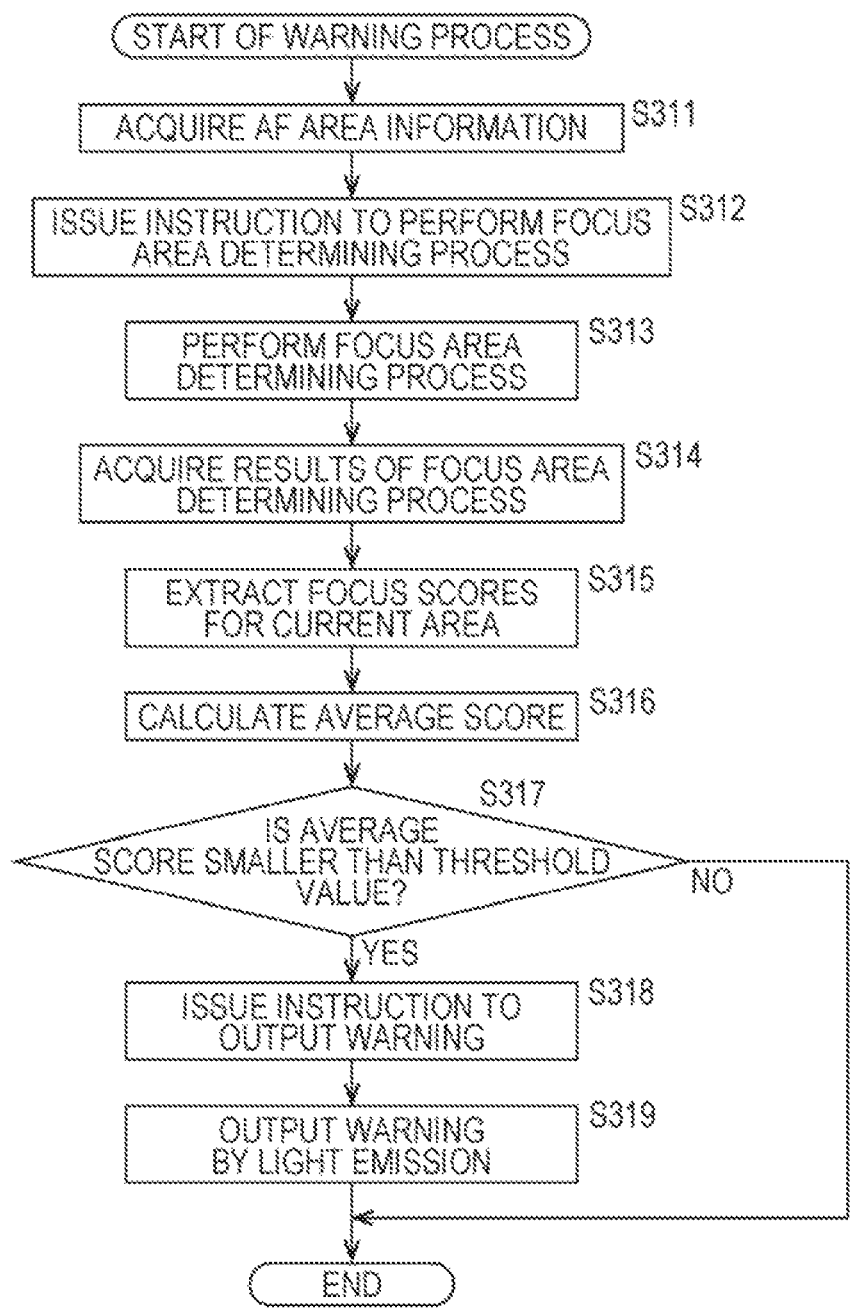
FIG. 20 is a flowchart for explaining a warning process.

Referring first to the flowchart in FIG. 20, the warning process corresponding to the warning process shown in FIG. 7 is described. The procedures in steps S311 through S317 are the same as the procedures in steps S41 through S47 in FIG. 7, and therefore, explanation of them is not repeated herein.

In step S318, the warning control unit 85 instructs the light emitting device driving unit 83 to issue a warning.

In step S319, the light emitting device driving unit 83 drives the light emitting device 60 in accordance with the instruction from the warning control unit 85, and causes the light emitting device 60 to issue a warning by emitting light. Driven by the light emitting device driving unit 83, the light emitting device 60 issues a warning by emitting light (lighting) in a predetermined pattern, and the warning process then comes to an end.

In the above manner, the imaging apparatus 11 issues a warning by light emission to prompt a check on the degree of focus. With this, the user can easily and intuitively recognize a need for a check on the degree of focus, even when not looking at the display unit 26.

Figure 21:
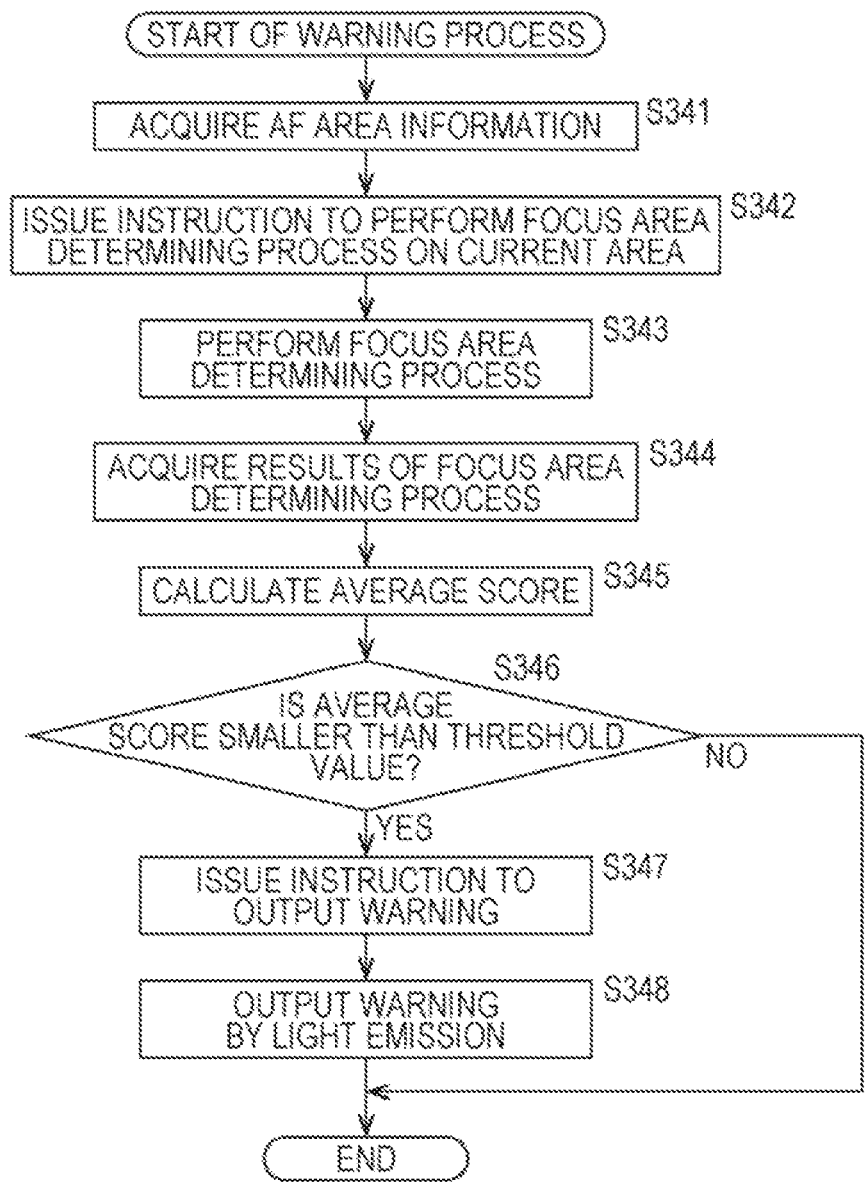
FIG. 21 is a flowchart for explaining a warning process.

Referring now to the flowchart in FIG. 21, the warning process corresponding to the warning process shown in FIG. 8 is described. The procedures in steps S341 through S346 are the same as the procedures in steps S71 through S76 in FIG. 8, and therefore, explanation of them is not repeated herein.

In step S347, the warning control unit 85 instructs the light emitting device driving unit 83 to issue a warning. In step S348, the light emitting device driving unit 83 drives the light emitting device 60 in accordance with the instruction from the warning control unit 85, and causes the light emitting device 60 to issue a warning by emitting light.

Driven by the light emitting device driving unit 83, the light emitting device 60 issues a warning by emitting light in a predetermined pattern, and the warning process then comes to an end.

In the above manner, the imaging apparatus 11 issues a warning by light emission to prompt a check on the degree of focus. With this, the user can easily and intuitively recognize a need for a check on the degree of focus, even when not looking at the display unit 26.

Figure 22:
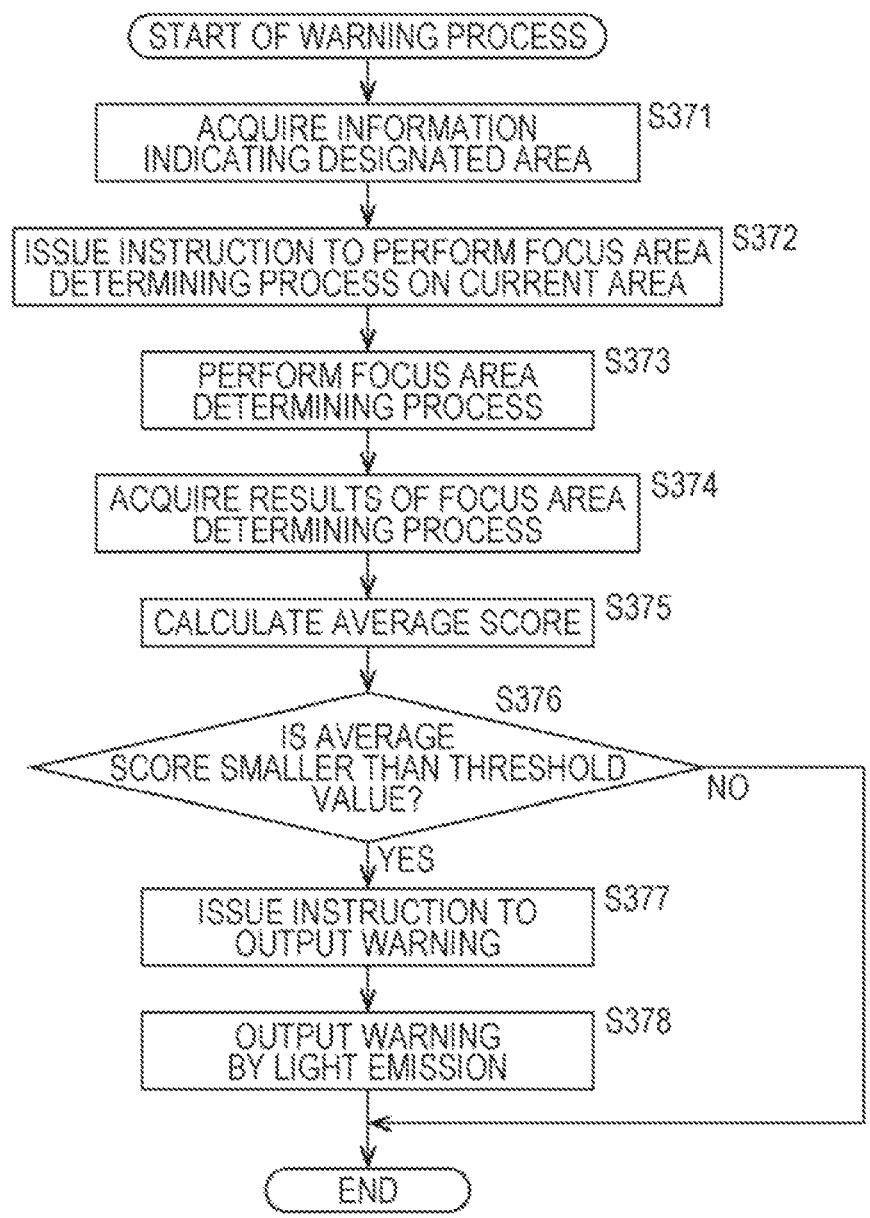
FIG. 22 is a flowchart for explaining a warning process.

Referring now to the flowchart in FIG. 22, the warning process corresponding to the warning process shown in FIG. 10 is described. The procedures in steps S371 through S376 are the same as the procedures in steps S101 through S106 in FIG. 10, and therefore, explanation of them is not repeated herein.

In step S377, the warning control unit 85 instructs the light emitting device driving unit 83 to issue a warning. In step S378, the light emitting device driving unit 83 drives the light emitting device 60 in accordance with the instruction from the warning control unit 85, and causes the light emitting device 60 to issue a warning by emitting light. Driven by the light emitting device driving unit 83, the light emitting device 60 issues a warning by emitting light in a predetermined pattern, and the warning process then comes to an end.

In the above manner, the imaging apparatus 11 issues a warning by light emission to prompt a check on the degree of focus. With this, the user can easily and intuitively recognize a need for a check on the degree of focus, even when not looking at the display unit 26.

Figure 23:
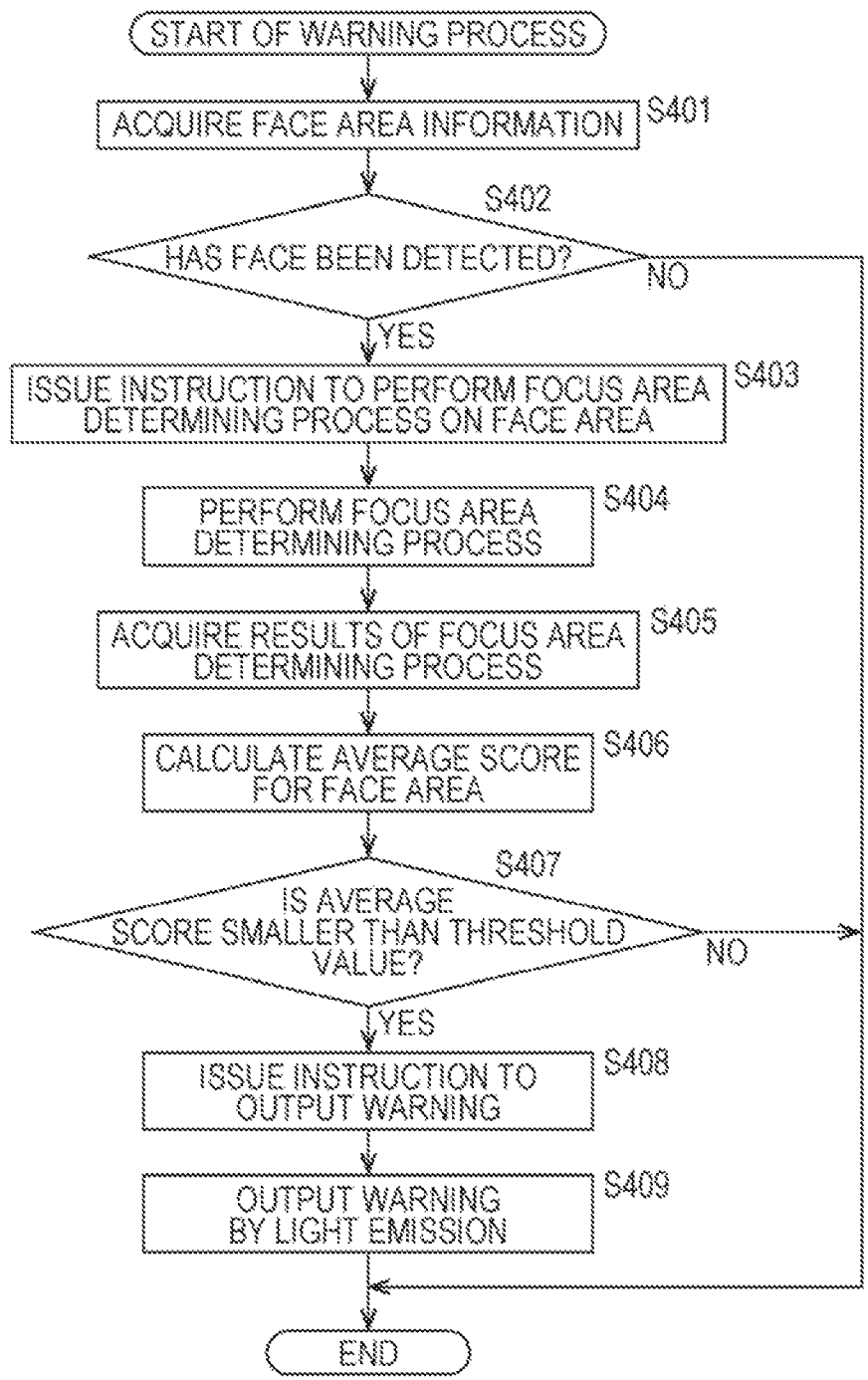
FIG. 23 is a flowchart for explaining a warning process.

Referring further to the flowchart in FIG. 23, the warning process corresponding to the warning process shown in FIG. 15 is described. The procedures in steps S401 through S407 are the same as the procedures in steps S161 through S167 in FIG. 15, and therefore, explanation of them is not repeated herein.

In step S408, the warning control unit 85 instructs the light emitting device driving unit 83 to issue a warning. In step S409, the light emitting device driving unit 83 drives the light emitting device 60 in accordance with the instruction from the warning control unit 85, and causes the light emitting device 60 to issue a warning by emitting light. Driven by the light emitting device driving unit 83, the light emitting device 60 issues a warning by emitting light in a predetermined pattern, and the warning process then comes to an end.

In the above manner, the imaging apparatus 11 issues a warning by light emission to prompt a check on the degree of focus. With this, the user can easily and intuitively recognize a need for a check on the degree of focus, even when not looking at the display unit 26.

Sixth Embodiment

<Description of a Warning Process>

Further, a warning may be issued by vibration according to another method of issuing a warning to the user.

In such cases, the processes shown in FIGS. 24 through 27 are performed as the processes corresponding to the respective warning processes described above with reference to FIGS. 7, 8, 10, and 15. Referring to the flowcharts in FIGS. 24 through 27, warning processes by vibration will be described below.

Figure 24:
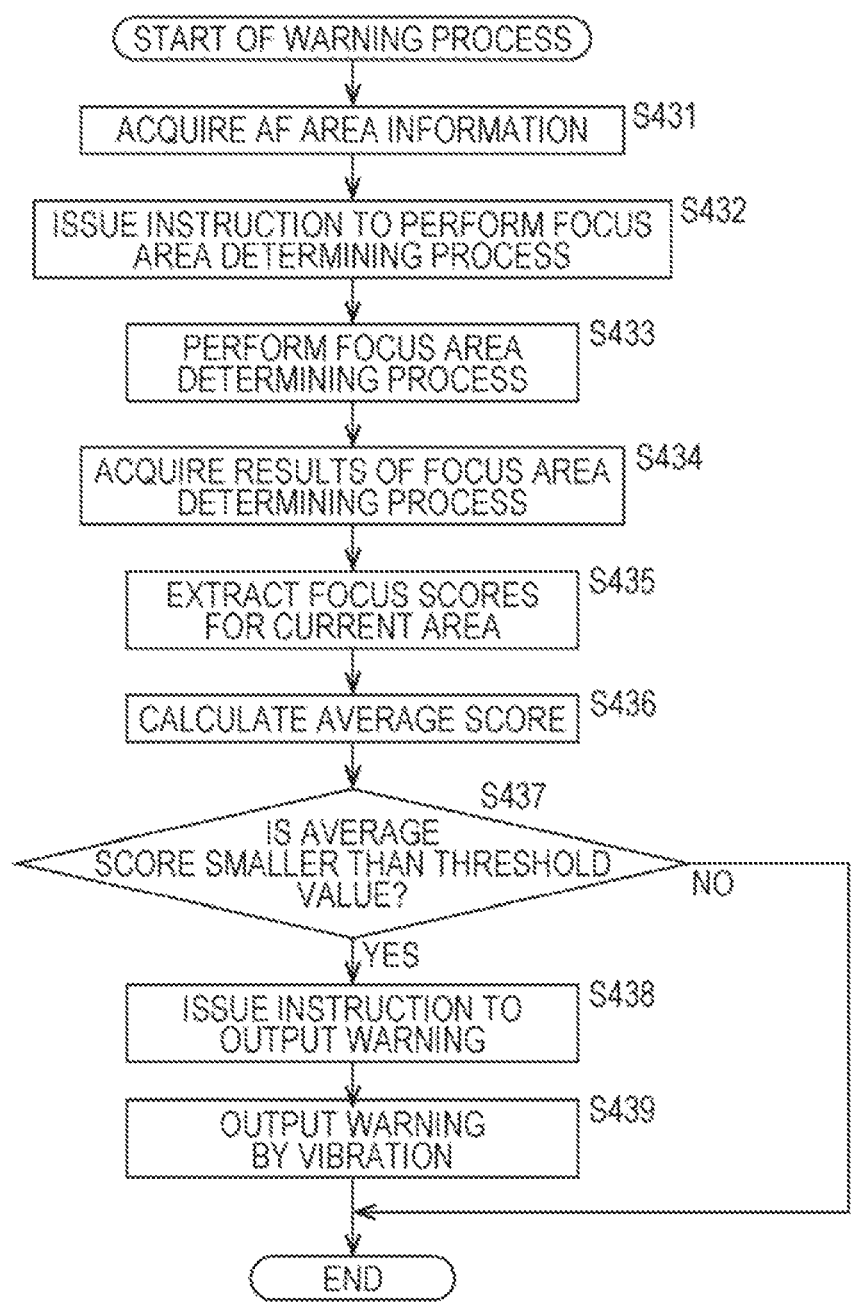
FIG. 24 is a flowchart for explaining a warning process.

Referring first to the flowchart in FIG. 24, the warning process corresponding to the warning process shown in FIG. 7 is described. The procedures in steps S431 through S437 are the same as the procedures in steps S41 through S47 in FIG. 7, and therefore, explanation of them is not repeated herein.

In step S438, the warning control unit 85 instructs the vibrator driving unit 81 to issue a warning. In step S439, the vibrator driving unit 81 drives the vibrating unit 58 in accordance with the instruction from the warning control unit 85, and causes the vibrating unit 58 to issue a warning by vibrating. Driven by the vibrator driving unit 81, the vibrating unit 58 issues a warning by vibrating in a predetermined pattern, and the warning process then comes to an end.

In the above manner, the imaging apparatus 11 issues a warning by vibration to prompt a check on the degree of focus. With this, the user can easily and intuitively recognize a need for a check on the degree of focus, even when not looking at the display unit 26.

Figure 25:
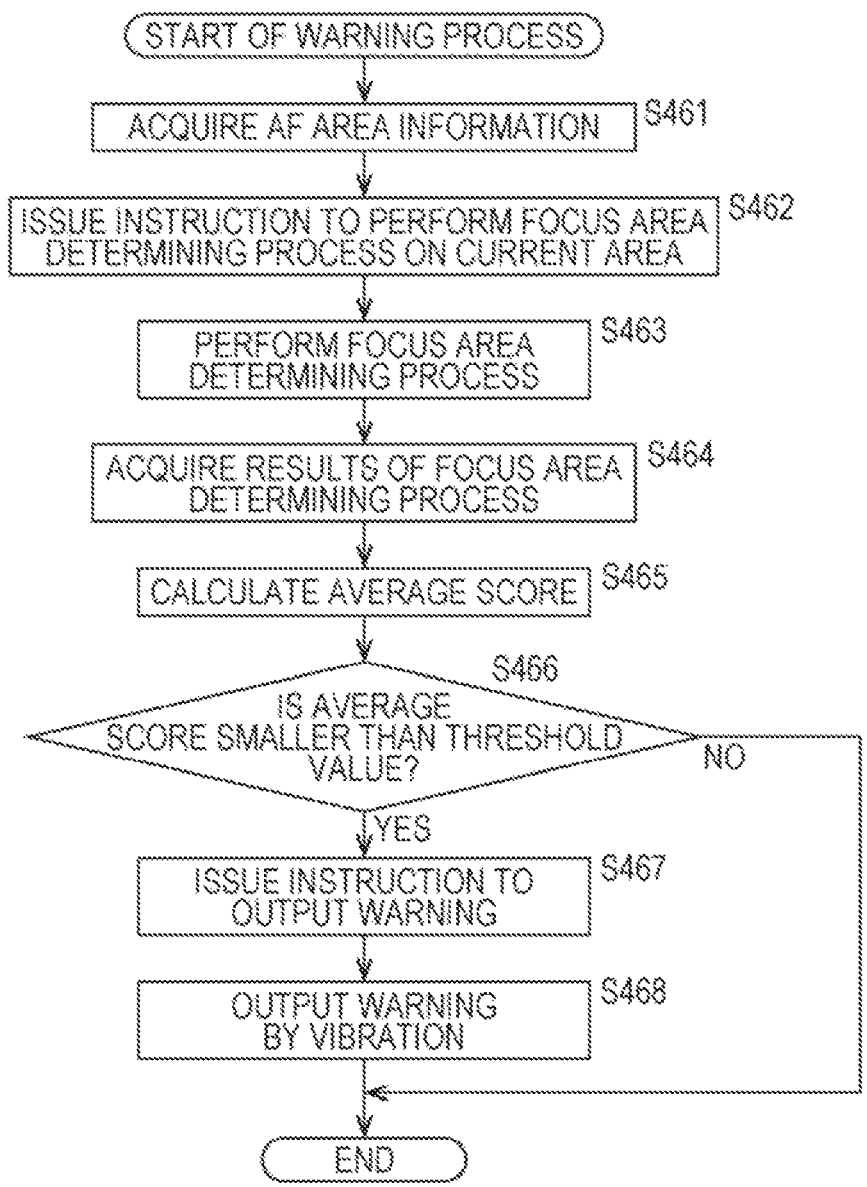
FIG. 25 is a flowchart for explaining a warning process.

Referring now to the flowchart in FIG. 25, the warning process corresponding to the warning process shown in FIG. 8 is described. The procedures in steps S461 through S466 are the same as the procedures in steps S71 through S76 in FIG. 8, and therefore, explanation of them is not repeated herein.

In step S467, the warning control unit 85 instructs the vibrator driving unit 81 to issue a warning. In step S468, the vibrator driving unit 81 drives the vibrating unit 58 in accordance with the instruction from the warning control unit 85, and causes the vibrating unit 58 to issue a warning by vibrating. Driven by the vibrator driving unit 81, the vibrating unit 58 issues a warning by vibrating in a predetermined pattern, and the warning process then comes to an end.

In the above manner, the imaging apparatus 11 issues a warning by vibration to prompt a check on the degree of focus. With this, the user can easily and intuitively recognize a need for a check on the degree of focus, even when not looking at the display unit 26.

Figure 26:
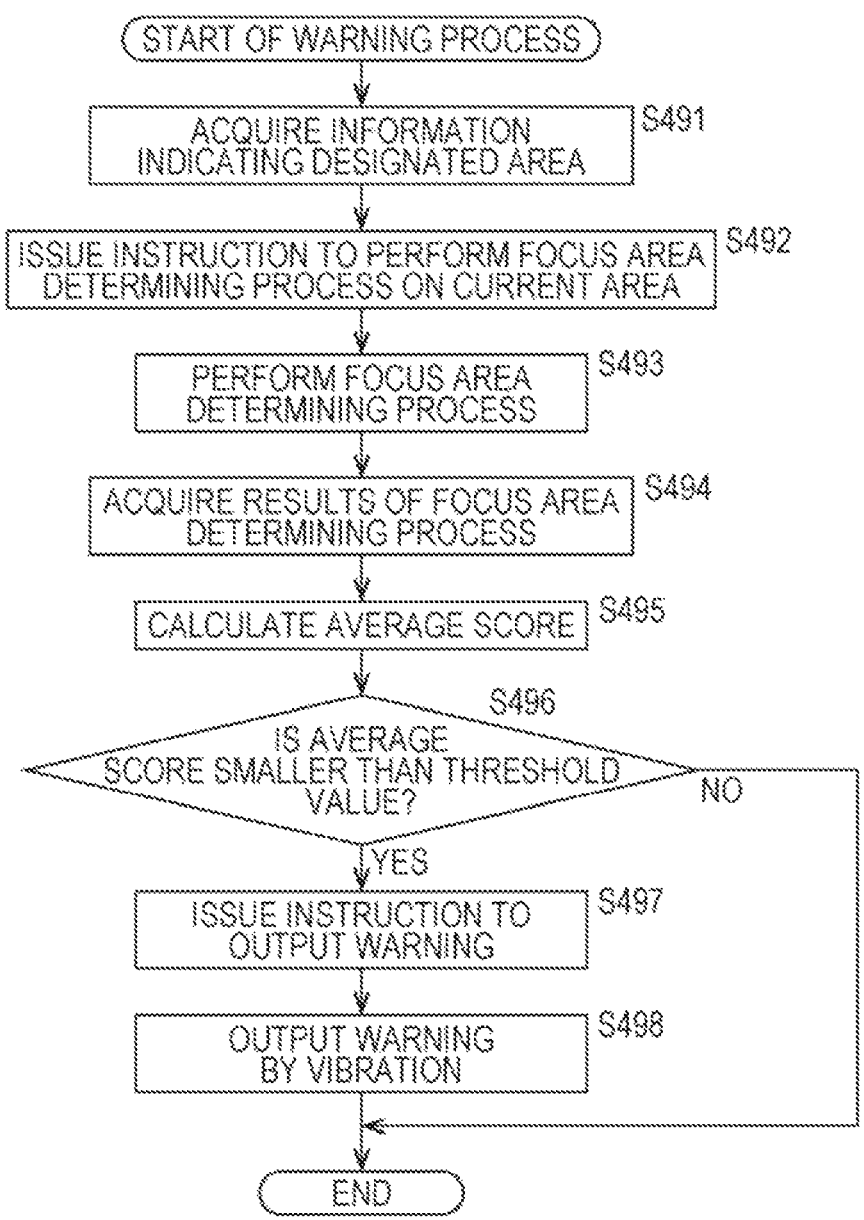
FIG. 26 is a flowchart for explaining a warning process.

Referring now to the flowchart in FIG. 26, the warning process corresponding to the warning process shown in FIG. 10 is described. The procedures in steps S491 through S496 are the same as the procedures in steps S101 through S106 in FIG. 10, and therefore, explanation of them is not repeated herein.

In step S497, the warning control unit 85 instructs the vibrator driving unit 81 to issue a warning. In step S498, the vibrator driving unit 81 drives the vibrating unit 58 in accordance with the instruction from the warning control unit 85, and causes the vibrating unit 58 to issue a warning by vibrating. Driven by the vibrator driving unit 81, the vibrating unit 58 issues a warning by vibrating in a predetermined pattern, and the warning process then comes to an end.

In the above manner, the imaging apparatus 11 issues a warning by vibration to prompt a check on the degree of focus. With this, the user can easily and intuitively recognize a need for a check on the degree of focus, even when not looking at the display unit 26.

Figure 27:
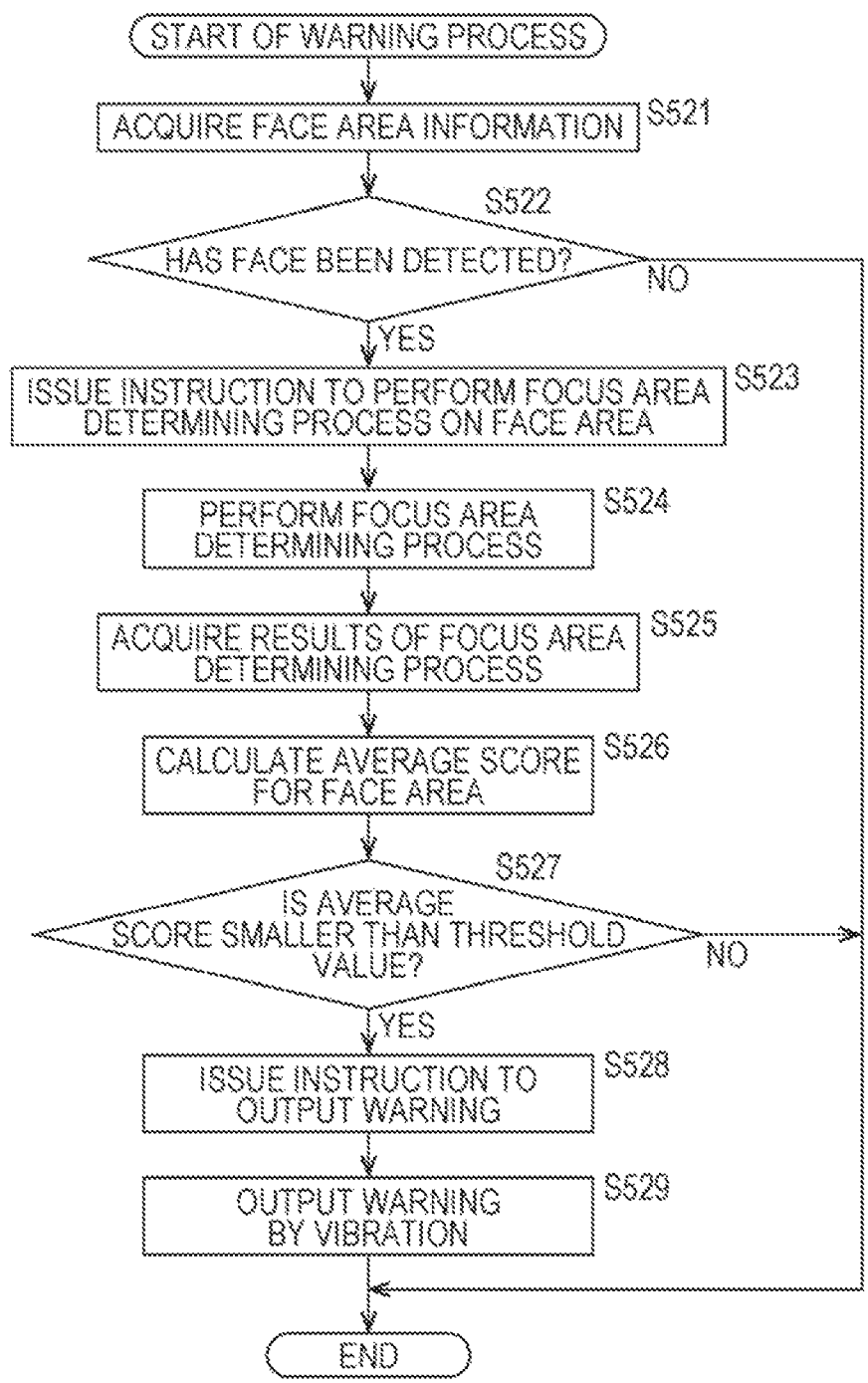
FIG. 27 is a flowchart for explaining a warning process.

Referring further to the flowchart in FIG. 27, the warning process corresponding to the warning process shown in FIG. 15 is described. The procedures in steps S521 through S527 are the same as the procedures in steps S161 through S167 in FIG. 15, and therefore, explanation of them is not repeated herein.

In step S528, the warning control unit 85 instructs the vibrator driving unit 81 to issue a warning. In step S529, the vibrator driving unit 81 drives the vibrating unit 58 in accordance with the instruction from the warning control unit 85, and causes the vibrating unit 58 to issue a warning by vibrating. Driven by the vibrator driving unit 81, the vibrating unit 58 issues a warning by vibrating in a predetermined pattern, and the warning process then comes to an end.

In the above manner, the imaging apparatus 11 issues a warning by vibration to prompt a check on the degree of focus. With this, the user can easily and intuitively recognize a need for a check on the degree of focus, even when not looking at the display unit 26.

In the above described examples, the warning methods are a method of issuing a warning by displaying it, a method of issuing a warning by sound, a method of issuing a warning by emitting light (lighting), and a method of issuing a warning by vibration. However, it is of course possible to issue a warning by an appropriate combination of some or all of the above methods involving display, sound, light emission, and vibration.

Also, the color or the concentration of the warning display, the volume of sound, the intensity of light, the vibration time, or the like may be made to vary in a stepwise manner or linearly with the value of the average score. That is, a warning may be issued in a color, at a concentration, at a sound volume, at a light intensity, or the like, which is determined by the value of the average score. The blinking pattern of display, or the pattern of sound, light emission, or vibration may be made to vary with the average score.

Seventh Embodiment

<Example Structure of the Exterior of a Multifunctional Portable Telephone Device>

In the above described embodiments, the present technology is applied to the imaging apparatus 11 that is a digital still camera or the like. However, the present technology can also be applied to multifunctional portable telephone devices as described above. In the description below, an example case where the present technology is applied to a multifunctional portable telephone device is described.

Figure 28:
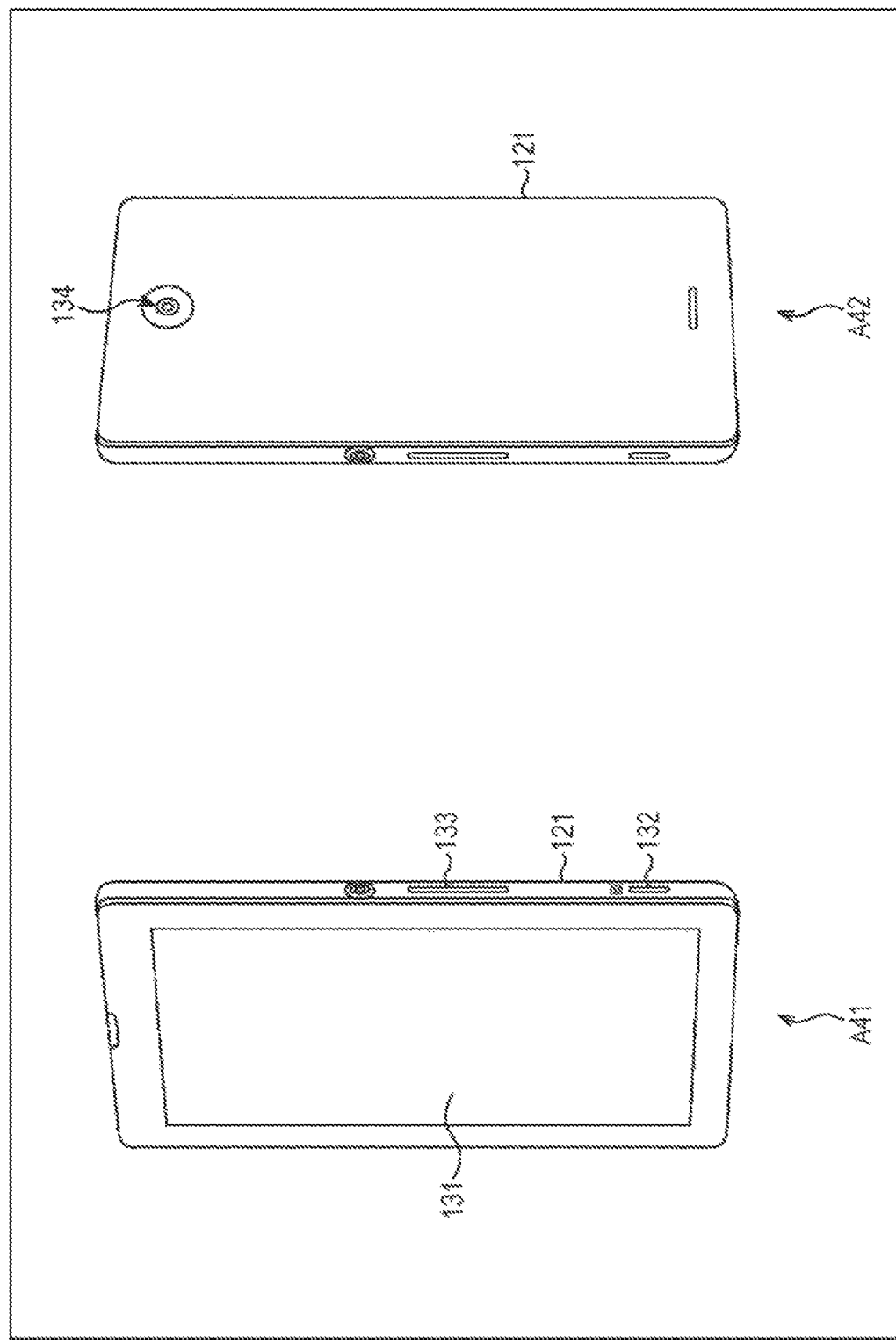
FIG. 28 is a diagram showing an example structure of the exterior of a multifunctional portable telephone device.

FIG. 28 is a diagram showing an example structure of the exterior of a multifunctional portable telephone device to which present technology is applied.

The multifunctional portable telephone device 121 is formed with a portable telephone device having a camera function. In FIG. 28, the drawing indicated by an arrow A41 is a front view of the multifunctional portable telephone device 121, and the drawing indicated by an arrow A42 is a back view of the multifunctional portable telephone device 121.

A display unit 131 formed with a liquid crystal panel or the like is provided on the front surface of the multifunctional portable telephone device 121, and a touch panel (not shown) is placed on the display unit 131. For example, the user looks at an image or the like displayed on the display unit 131, or operates an icon or the like displayed on the display unit 131.

Also, various buttons, such as a shutter button 132 that functions as a shutter button at a time of photographing using the camera function, and a button 133 for adjusting the volume of sound, are provided on a side surface of the multifunctional portable telephone device 121.

Further, an optical system 134 that guides light entering from an object toward an imager (not shown) is provided on the back surface of the multifunctional portable telephone device 121, and the user directs the optical system 134 toward a desired object, to photograph the object.

<Example Functional Structure of the Multifunctional Portable Telephone Device>

Figure 29:
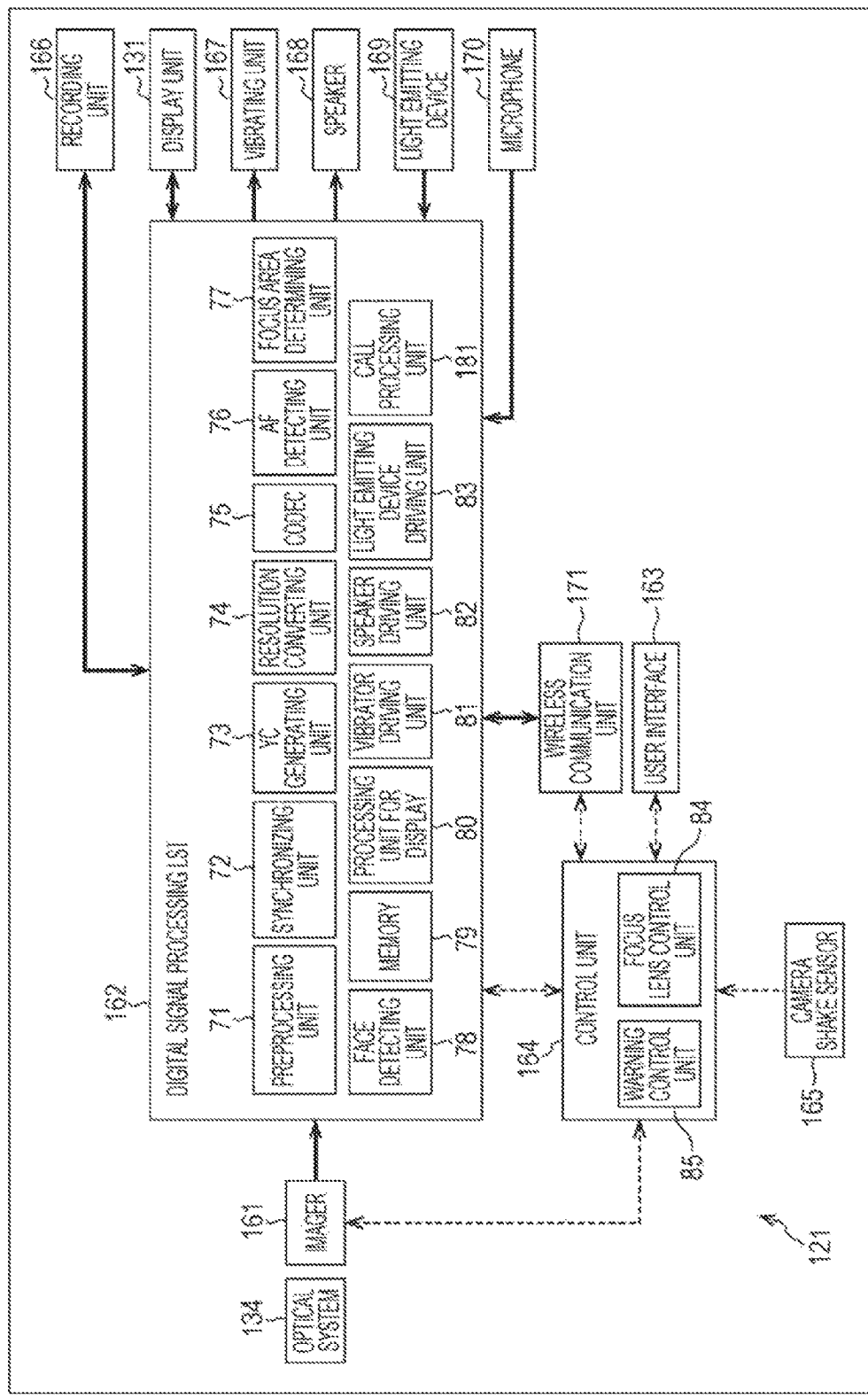
FIG. 29 is a diagram showing an example functional structure of the multifunctional portable telephone device.

The functional structure of the multifunctional portable telephone device 121 shown in FIG. 28 is like the structure shown in FIG. 29, for example. In FIG. 29, the components equivalent to those shown in FIG. 28 or FIG. 2 are denoted by the same reference numerals as those used in FIG. 28 or FIG. 2, and explanation of them will not be unnecessarily repeated.

The multifunctional portable telephone device 121 includes the optical system 134, an imager 161, a digital signal processing LSI 162, a user interface 163, a control unit 164, a camera shake sensor 165, a recording unit 166, the display unit 131, a vibrating unit 167, a speaker 168, a light emitting device 169, a microphone 170, and a wireless communication unit 171.

The optical system 134, the components from the imager 161 to the recording unit 166, the display unit 131, and the components from the vibrating unit 167 to the light emitting device 169 are the same as the optical system 21, the components from the imager 51 to the control unit 54, the camera shake sensor 56, the recording unit 57, the display unit 26, and the components from the vibrating unit 58 to the light emitting device 60 of the imaging apparatus 11, and therefore, explanation of them is not repeated herein.

In this example, the control unit 164 includes a focus lens control unit 84 and a warning control unit 85. The user interface 163 is formed with the touch panel placed on the display unit 131, the shutter button 132, the button 133, and the like.

The digital signal processing LSI 162 performs image stabilization electronically on a photographed image in accordance with an output from the camera shake sensor 165. Further, the digital signal processing LSI 162 includes a preprocessing unit 71, a synchronizing unit 72, a YC generating unit 73, a resolution converting unit 74, a CODEC 75, an AF detecting unit 76, a focus area determining unit 77, a face detecting unit 78, a memory 79, a processing unit 80 for display, a vibrator driving unit 81, a speaker driving unit 82, a light emitting device driving unit 83, and a call processing unit 181.

The call processing unit 181 performs processing related to a call made by the user for another telephone device. For example, the call processing unit 181 supplies an audio signal obtained by the microphone 170 gathering voice of the user to the wireless communication unit 171, and causes the wireless communication unit 171 to transmit the audio signal to the telephone device on the other and via a base station or the like. Also, the call processing unit 181 supplies an audio signal that is transmitted from the telephone device on the other end and is received by the wireless communication unit 171, to the speaker 168 via the speaker driving unit 82, and causes the speaker 168 to reproduce the audio signal.

The wireless communication unit 171 performs wireless communication under the control of the control unit 164. For example, the wireless communication unit 171 exchanges audio signals with the other end via a base station or the like, and exchanges information by relatively near field wireless communication such as Wi-Fi (registered trademark).

<Description of a Photographing Process and a Warning Process>

Figure 30:
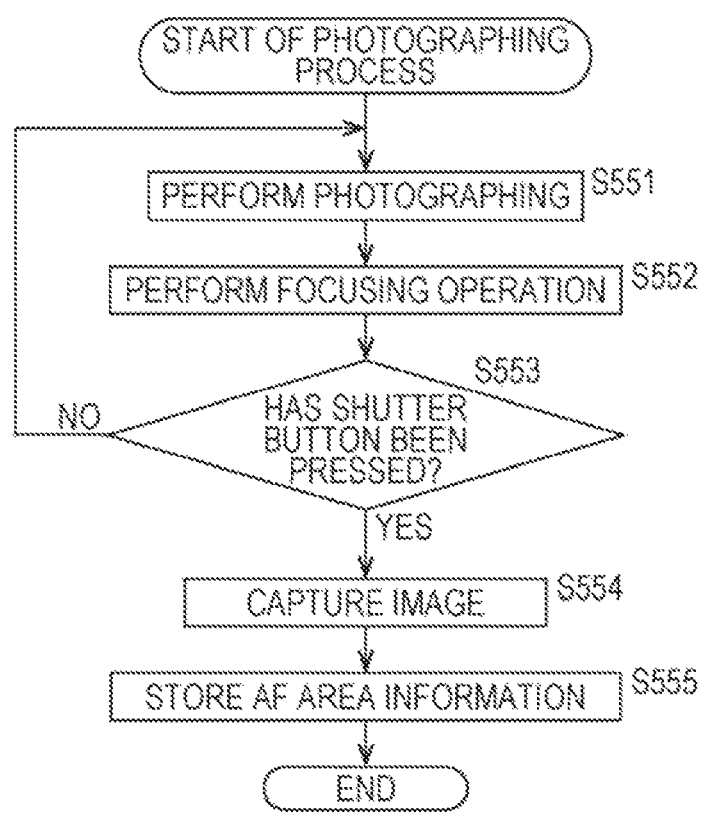
FIG. 30 is a flowchart for explaining a photographing process.

Next, specific operations of the above described multifunctional portable telephone device 121 are described. Referring first to the flowchart in FIG. 30, a photographing process to be performed by the multifunctional portable telephone device 121 is described. In the photographing process, the procedures in steps S551 through S555 are carried out. However, these procedures are the same as the procedures in steps S11 through S15 in FIG. 6, and therefore, explanation of them is not repeated herein.

After performing the photographing process, the multifunctional portable telephone device 121 performs a warning process in a case where the user issues an instruction for warning display by operating the user interface 163 while a preview image is displayed, or in a case where a preview image is displayed for a predetermined period of time in a setting where the warning process is to start automatically, for example.

Figure 31:
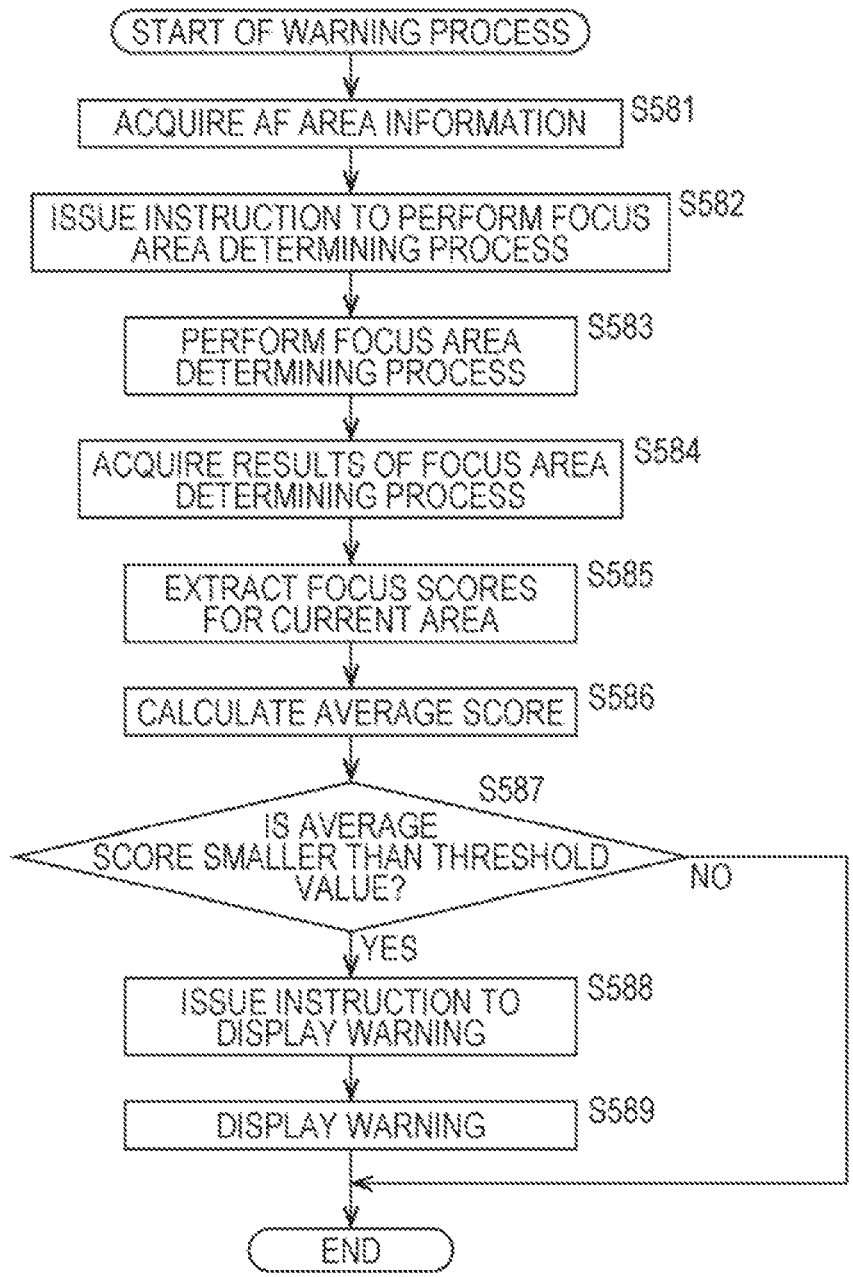
FIG. 31 is a flowchart for explaining a warning process.

Referring to the flowchart in FIG. 31, a warning process to be performed by the multifunctional portable telephone device 121 is described below. In the warning process shown in FIG. 31, the procedures in steps S581 through S589 are carried out. However, these procedures are the same as the procedures in steps S41 through S49 in FIG. 7, and therefore, explanation of them is not repeated herein.

Also, the multifunctional portable telephone device 121 may perform the same process as the photographing process shown in FIG. 14, and the same process as any of the warning processes shown in FIGS. 8, 10, and 15 through 27.

Eighth Embodiment

<Example Structure of the Exterior of a Wearable Camera>

Further, the present technology can be applied to a small-sized digital video camera called wearable camera that a user can wear on his/her head or the like. In the description below, an example case where the present technology is applied to a wearable camera is described.

Figure 32:
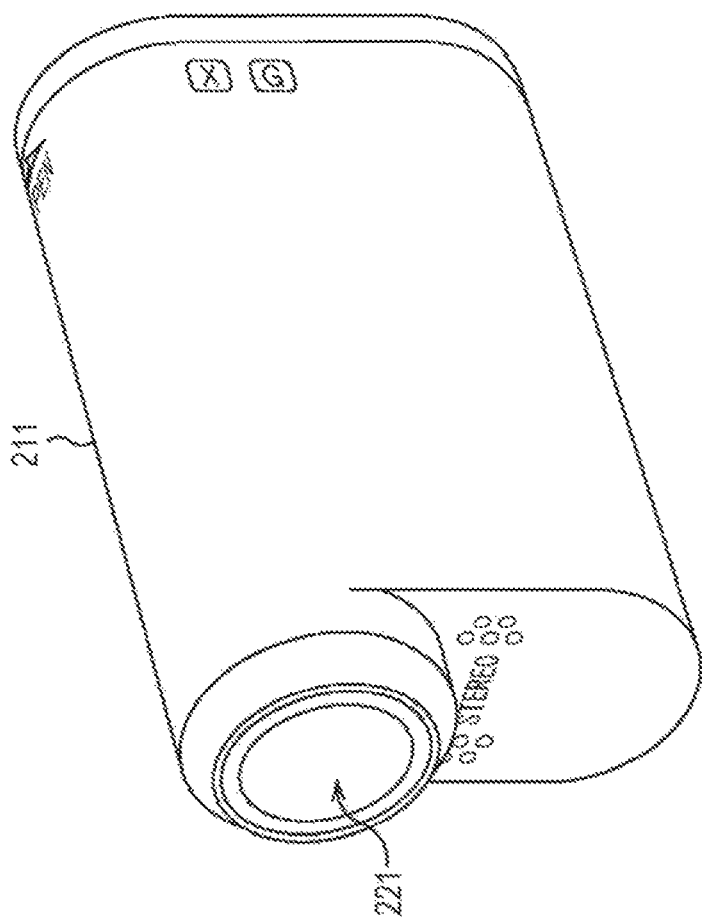
FIG. 32 is a diagram showing an example structure of the exterior of a wearable camera.

FIG. 32 is a diagram showing an example structure of the exterior of a wearable camera to which present technology is applied.

An optical system 221 that guides light entering from an object toward an imager (not shown) is provided on the front surface of the wearable camera 211, and the user directs the optical system 221 toward a desired object, to record the object.

Various buttons such as a record button (not shown) are provided on the back surface of the wearable camera 211, and the user operates those buttons, to issue instructions for recording and reproduction. Further, the wearable camera 211 is designed to exchange information with another device, such as the multifunctional portable telephone device 121 shown in FIG. 28, through wireless communication.

<Example Functional Structure of the Wearable Camera>

Figure 33:
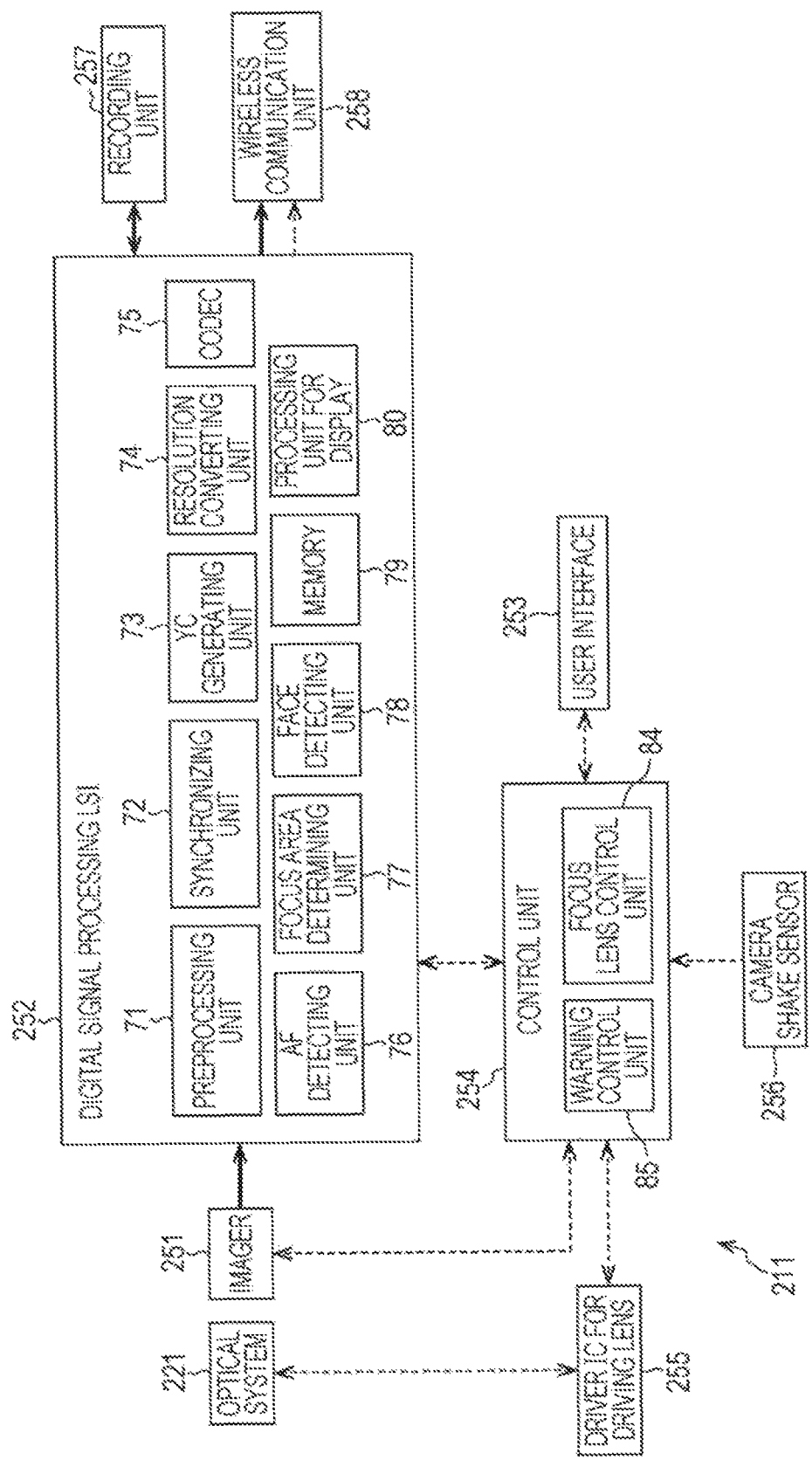
FIG. 33 is a diagram showing an example functional structure of the wearable camera.

The functional structure of the wearable camera 211 shown in FIG. 32 is like the structure shown in FIG. 33, for example. In FIG. 33, the components equivalent to those shown in FIG. 32 or FIG. 2 are denoted by the same reference numerals as those used in FIG. 32 or FIG. 2, and explanation of them will not be unnecessarily repeated.

The wearable camera 211 includes the optical system 221, an imager 251, a digital signal processing LSI 252, a user interface 253, a control unit 254, a driver IC 255 for driving the lens, a camera shake sensor 256, a recording unit 257, and a wireless communication unit 258.

The optical system 221 and the components from the imager 251 to the recording unit 257 are the same as the optical system 21 and the components from the imager 51 to the recording unit 57 shown in FIG. 2, and therefore, explanation of them is not repeated herein.

In this example, the control unit 254 includes a focus lens control unit 84 and a warning control unit 85. The digital signal processing LSI 252 includes a preprocessing unit 71, a synchronizing unit 72, a YC generating unit 73, a resolution converting unit 74, a CODEC 75, an AF detecting unit 76, a focus area determining unit 77, a face detecting unit 78, a memory 79, and a processing unit 80 for display.

The wireless communication unit 258 performs wireless communication under the control of the digital signal processing LSI 252. For example, the wireless communication unit 258 transmits and receives information through relatively near field wireless communication such as Wi-Fi (registered trademark).

<Description of a Photographing Process>

Figure 34:
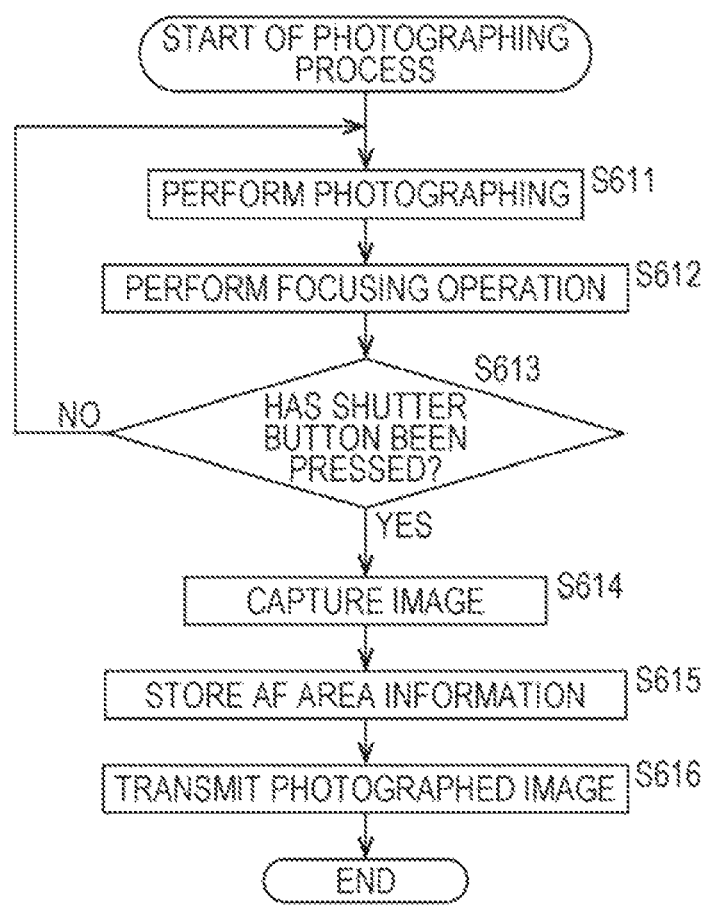
FIG. 34 is a flowchart for explaining a photographing process.

Next, specific operations of the above described wearable camera 211 are described. Referring first to the flowchart in FIG. 34, a photographing process to be performed by the wearable camera 211 is described.

The procedures in steps S611 through S615 are the same as the procedures in steps S11 through S15 in FIG. 6, and therefore, explanation of them is not repeated herein.

The processing unit 80 for display supplies a photographed image to the wireless communication unit 258, and instructs the wireless communication unit 258 to transmit the photographed image to the multifunctional portable telephone device 121.

In step S616, the wireless communication unit 258 transmits the photographed image supplied from the processing unit 80 for display to the multifunctional portable telephone device 121 through wireless communication. The photographing process then comes to an end.

<Description of a Warning Determining Process>

After performing a photographing process and capturing a photographed image, the wearable camera 211 performs a warning determining process. In the warning determining process, the wearable camera 211 determines whether to issue a warning about the degree of focus, for example, and instructs the multifunctional portable telephone device 121 to display a warning in accordance with a result of the determination. This warning determining process is started when an instruction is issued from the user, or is automatically started in accordance with settings.

Figure 35:
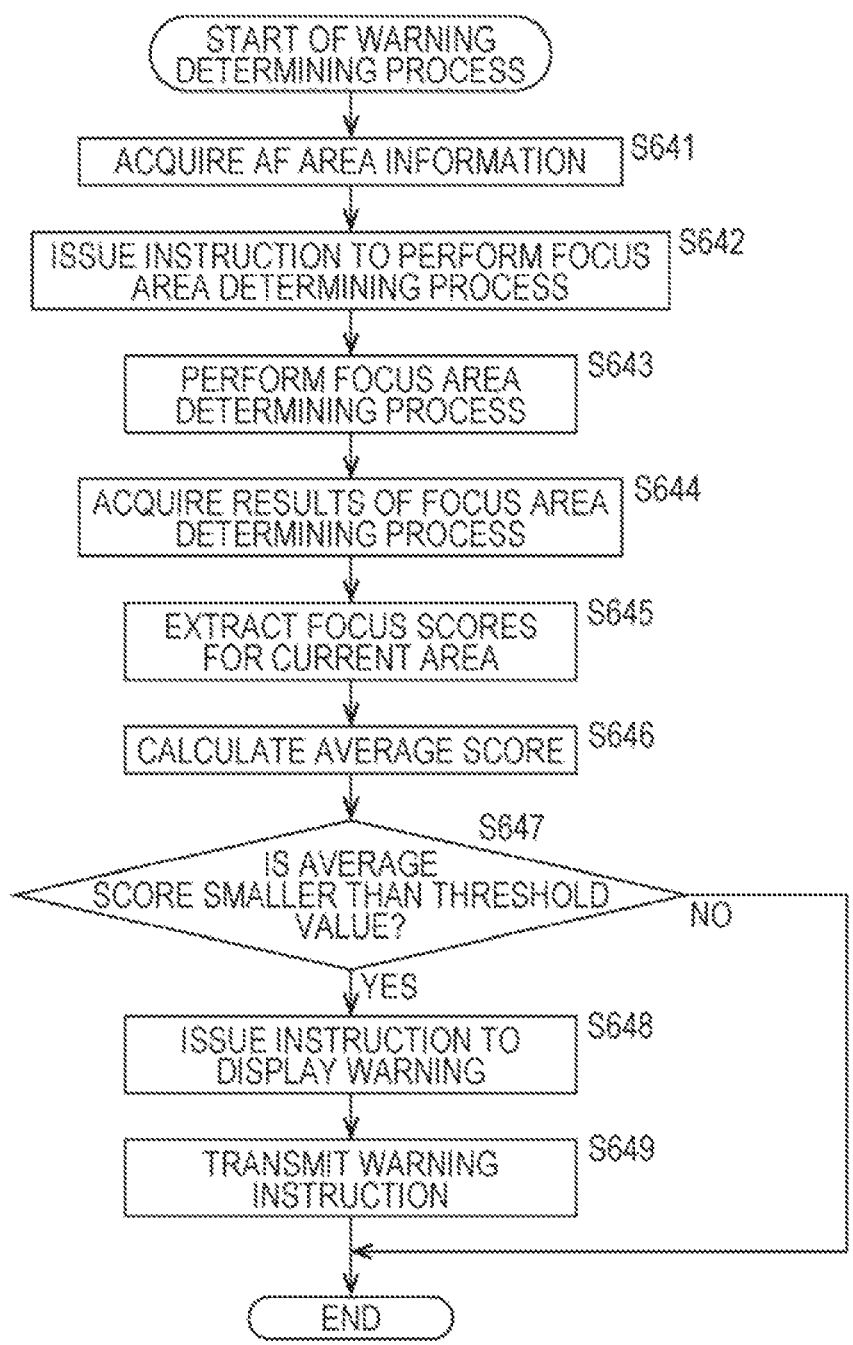
FIG. 35 is a flowchart for explaining a warning determining process.

Referring now to the flowchart in FIG. 35, the warning determining process to be performed by the wearable camera 211 is described.

The procedures in steps S641 through S647 are the same as the procedures in steps S41 through S47 in FIG. 7, and therefore, explanation of them is not repeated herein.

In step S648, the warning control unit 85 instructs the processing unit 80 for display to display a warning. The processing unit 80 for display in turn generates a warning instruction that is information indicating that a warning is to be displayed, and supplies the warning instruction to the wireless communication unit 258.

In step S649, the wireless communication unit 258 transmits the warning instruction supplied from the processing unit 80 for display to the multifunctional portable telephone device 121 through wireless communication. The warning determining process then comes to an end.

In the above manner, the wearable camera 211 determines whether to display a warning by performing a focus area determining process on a photographed image obtained through recording, and, in accordance with a result of the determination, transmits a warning display instruction to the multifunctional portable telephone device 121.

As a warning display instruction is transmitted as necessary, the user can more easily and intuitively check the degree of focus of a photographed image on the multifunctional portable telephone device 121 after the recording.

<Description of a Display Process>

Figure 36:
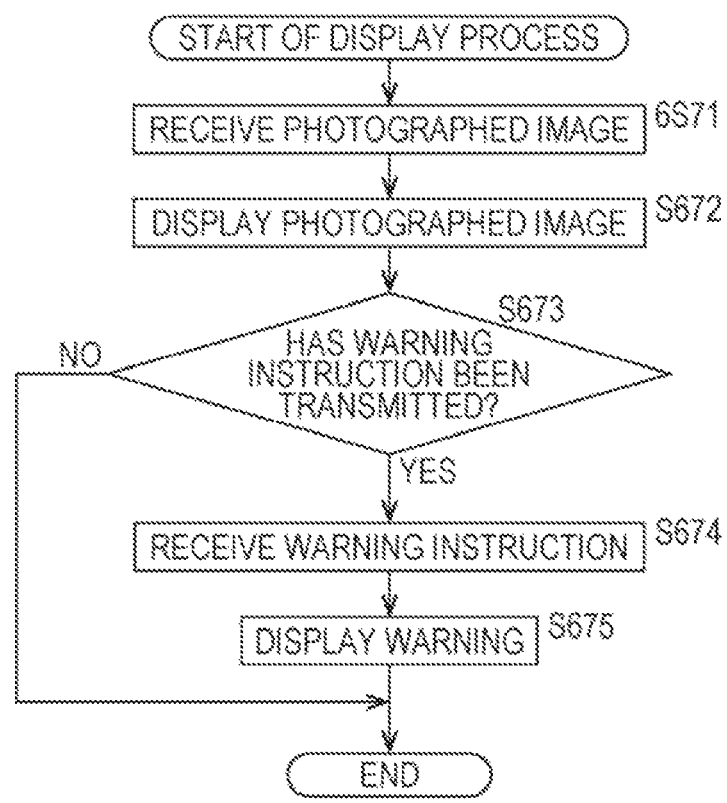
FIG. 36 is a flowchart for explaining a display process.

When a photographed image is transmitted from the wearable camera 211, the multifunctional portable telephone device 121 starts a display process to receive and display the photographed image. Referring now to the flowchart in FIG. 36, the display process to be performed by the multifunctional portable telephone device 121 is described.

In step S671, the wireless communication unit 171 receives a photographed image transmitted from the wearable camera 211 through wireless communication, and supplies the photographed image to the digital signal processing LSI 162.

In step S672, the processing unit 80 for display supplies the photographed image supplied from the wireless communication unit 171 to the display unit 131, and causes the display unit 131 to display the photographed image. Thus, the photographed image is displayed as a preview image.

In step S673, the warning control unit 85 determines whether a warning instruction has been transmitted from the wearable camera 211.

If it is determined in step S673 that any warning instruction has not been transmitted, any warning is not displayed, and the display process comes to an end.

If it is determined in step S673 that a warning instruction has been transmitted, on the other hand, the wireless communication unit 171 in step S674 receives the warning instruction transmitted from the wearable camera 211, and supplies the warning instruction to the control unit 164 via the digital signal processing LSI 162.

In step S675, the warning control unit 85 performs warning display in accordance with the warning instruction supplied from the digital signal processing LSI 162. The display process then comes to an end.

Specifically, the warning control unit 85 instructs the processing unit 80 for display to display a warning. The processing unit 80 for display generates an image and a text message for displaying a warning such as a warning icon in accordance with the instruction from the warning control unit 85, and then supplies the image and the text message to the display unit 131, which then displays the image and the text message as a warning.

In the above manner, the multifunctional portable telephone device 121 performs warning display in accordance with an instruction from the wearable camera 211. With this, the user can more easily and intuitively recognize a need for a check on the degree of focus of a photographed image on a larger screen.

Also, the wearable camera 211 may perform the same process as the photographing process shown in FIG. 14, and the same process as any of the warning processes shown in FIGS. 8, 10, and 15 through 27.

Ninth Embodiment

The above described present technology can of course be applied not only to still images but also to moving images.

For example, after a moving image as a photographed image is taken, information related to a degree of focus can be supplied to the user when the moving image obtained by the recording is reproduced.

Specifically, in a case where an image (an icon) or the like indicating a degree of focus is displayed as the information related to a degree of focus, the same process as the warning process shown in FIG. 7 is performed, for example. In this process, a photographed image obtained by photographing is read from the recording unit 57 as appropriate, and an average score for each frame of a moving image as the photographed image is calculated by the warning control unit 85.

In the procedure corresponding to step S48, the warning control unit 85 instructs the processing unit 80 for display to control the display unit 26 so that an image or the like in the color or at the concentration corresponding to the value of the average score is displayed on the display unit 26 for each frame, for example. That is, an image or the like in the color or at the concentration that is determined beforehand for the value of the average score is superimposed, as the image or the like indicating a degree of focus, on the moving image being reproduced.

Therefore, the image or the like indicating a degree of focus is continuously displayed while the moving image as the photographed image is being reproduced, and the color or the concentration of the image or the like changes over time depending on the value of the average score for each frame.

As the average score changes over time, the color or the concentration of the image or the like that is displayed on the display unit 26 and indicates a degree of focus is made to change over time as described above. With this, the user can easily recognize a change in the degree of focus, such as an increase in the degree of focus. Thus, the user can easily recognize the degree of focus of a photographed image after photographing.

In a case where an image or the like indicating a degree of focus is displayed for each frame, the image or the like is preferably displayed so that the user looking at the displayed image or the like can intuitively and instantly determine whether the degree of focus is sufficient. The information to be displayed is not necessarily in the form of an image, but a numerical value or a text message indicating a degree of focus may be displayed.

In view of the above, it can be argued that displaying a degree of focus is displaying a warning about a degree of focus.

The above described process for notifying the user of the degree of focus of a taken moving image is applied to the process described in the first embodiment. However, this process can of course be applied to the first modification of the first embodiment and the second through eighth embodiments described above.

Tenth Embodiment

In the above described example, information related to focus is continuously displayed from the start to the end of reproduction of a moving image as a photographed image. However, a warning about a degree of focus may be displayed only for a zone in which the degree of focus is insufficient.

In such a case, in the warning process shown in FIG. 7, for example, a photographed image obtained by photographing is read from the recording unit 57 as appropriate, and an average score for each frame of a moving image as the photographed image is calculated by the warning control unit 85. In step S47, the warning control unit 85 performs a threshold process on the average score for each frame.

The warning control unit 85 then selects a zone for which a warning is to be displayed. The zone is formed with one or more consecutive frames the average scores for which have been determined to be smaller than a threshold value.

When a photographed image is reproduced, the warning control unit 85 instructs the processing unit 80 for display to display a warning for each zone selected in the above manner, and the processing unit 80 for display causes the display unit 26 to display a warning in accordance with the instruction.

Specifically, the warning control unit 85 calculates a representative value of the average scores for the current zone, and performs control so that an image or the like is displayed in the color or at the concentration predetermined for the representative value. Here, the representative value is the average value of the average scores for the respective frames in the current zone, for example.

Therefore, in this example, any warning is not displayed while the degree of focus is determined to be sufficient. A warning is displayed in the zone formed with frames in which the degree of focus is determined to be insufficient. When a warning is displayed, the warning is continuously displayed in the same color or at the same concentration in the zone formed with frames in which the degree of focus is determined to be insufficient or the average score is determined to be smaller than the threshold value.

Further, when a photographed image is reproduced, a time bar indicating each reproduction position from the top to the end of the photographed image is displayed, and a degree of focus may be displayed on the time bar. For example, the respective positions in the time bar are displayed in the colors or at the concentrations predetermined for the average scores for the corresponding frames in the photographed image. With this, the user can easily determine which portion of the entire moving image is insufficient in the degree of focus, by looking at the time bar.

In the above described example, a warning is displayed even when only the average score for one frame is smaller than the threshold value. However, a warning may be displayed for the zone, if a situation where the degree of focus is insufficient continues only for a predetermined time such as a few seconds, or if the average scores for only a predetermined number of consecutive frames are smaller than the threshold value.

The above described process for issuing a warning about the degree of focus of a moving image is applied to the process described in the first embodiment. However, this process can of course be applied to the first modification of the first embodiment and the second through eighth embodiments described above.

Eleventh Embodiment

Further, the present technology can also be applied in a case where a moving image is taken as a photographed image.

In such a case, a moving image as a photographed image is used as the current processing target, and the process corresponding to the warning process described with reference to FIG. 7 is performed. That is, a photographed image that is several frames older than the photographed image being currently taken, or a photographed image of an older frame than the current frame, is used as the current processing target, and the same process as the process described in the ninth embodiment is performed.

Specifically, in the procedure corresponding to step S46, for example, the warning control unit 85 calculates an average score for an image of a past frame selected as the current processing target in the moving image as the photographed image. In the procedure corresponding to step S48, the warning control unit 85 instructs the processing unit 80 for display to control the display unit 26 so that an image or the like in the color or at the concentration corresponding to the value of the average score calculated for the past frame is displayed on the display unit 26, for example. That is, an image or the like in the color or at the concentration that is determined beforehand for the value of the average score is displayed as the image or the like indicating the degree of focus.

In view of this, when a moving image is taken as a photographed image, the image or the like corresponding to the average score calculated for a frame that is several frames older than the frame being currently taken is displayed as the information indicating the degree of focus in this example.

An image or the like indicating the degree of focus is displayed in accordance with a past frame in this embodiment, because it is normally rare that the degree of focus rapidly changes over a few frames during photographing. Even if the degree of focus is displayed in accordance with a frame that is several frames older, a large difference is hardly generated between the current degree of focus and the displayed degree of focus.

As the image or the like indicating a degree of focus is continuously displayed in the above manner while a moving image as a photographed image is being reproduced, the color or the concentration of the image or the like changes over time depending on the value of the average score for each frame.

As the average score changes over time, the color or the concentration of the image or the like that is displayed on the display unit 26 and indicates a degree of focus is made to change over time as described above. With this, the user can easily recognize a change in the degree of focus, such as an increase in the degree of focus. Thus, the user can easily recognize the degree of focus of a photographed image during photographing.

In the above example, the degree of focus is continuously displayed during photographing. However, a warning about an insufficient degree of focus may be displayed only when the degree of focus is insufficient.

In such a case, the warning process shown in FIG. 7 is performed, for example, while a photographed image is being taken. In this warning process, the warning control unit 85 in step S46 calculates an average score for a photographed image of a past frame that is several frames older than the current frame being taken at the moment. In step S47, the warning control unit 85 performs a threshold process on the calculated average score. In accordance with a result of the threshold process, the warning control unit 85 instructs the processing unit 80 for display to display a warning. In accordance with the instruction, the processing unit 80 for display causes the display unit 26 to display a warning. At this point, the warning control unit 85 performs control so that an image or the like is displayed in the color or at the concentration predetermined for the value of the average score.

In view of this, when a moving image is taken as a photographed image, a check is made to determine whether a warning needs to be displayed in accordance with a frame that is several frames older than the frame currently being taken, and a warning is displayed in accordance with a result of the check in this example.

In a case where warning display is performed in the above manner, any warning is not displayed while the degree of focus is determined to be sufficient, and a warning is displayed when the degree of focus is determined to be insufficient. Also, the color or the concentration of the image or the like displayed as a warning changes over time depending on the degree of focus or the value of the average score.

The above described process for displaying an image or the like indicating a degree of focus and a warning during photographing is applied to the process described in the first embodiment. However, this process can of course be applied to the first modification of the first embodiment and the second through eighth embodiments described above.

The above-described series of processes may be performed by hardware or may be performed by software. Where the series of processes are to be performed by software, the program that forms the software is installed into a computer. Here, the computer may be a computer incorporated into special-purpose hardware, or may be a general-purpose computer that can execute various kinds of functions as various kinds of programs are installed thereinto.

FIG. 37 is a block diagram showing an example structure of the hardware of a computer that performs the above-described series of processes in accordance with a program.

In the computer, a Central Processing Unit (CPU) 501, a Read Only Memory (ROM) 502, and a Random Access Memory (RAM) 503 are connected to one another by a bus 504.

An input/output interface 505 is further connected to the bus 504. An input unit 506, an output unit 507, a recording unit 508, a communication unit 509, and a drive 510 are connected to the input/output interface 505.

The input unit 506 is formed with a keyboard, a mouse, a microphone, an imaging device, and the like. The output unit 507 is formed with a display, a speaker, and the like. The recording unit 508 is formed with a hard disk, a nonvolatile memory, or the like. The communication unit 509 is formed with a network interface or the like. The drive 510 drives a removable medium 511 such as a magnetic disk, an optical disk, a magneto optical disk, or a semiconductor memory.

In the computer having the above-described structure, the CPU 501 loads a program recorded in the recording unit 508 into the RAM 503 via the input/output interface 505 and the bus 504, for example, and executes the program, so that the above-escribed series of processes are performed.

The program to be executed by the computer (the CPU 501) may be recorded on the removable medium 511 as a packaged medium to be provided, for example. Alternatively, the program can be provided via a wired or wireless transmission medium such as a local area network, the Internet, or digital satellite broadcasting.

In the computer, the program can be installed into the recording unit 508 via the input/output interface 505 when the removable medium 511 is mounted on the drive 510. The program can also be received by the communication unit 509 via a wired or wireless transmission medium, and be installed into the recording unit 508. Alternatively, the program may be installed beforehand into the ROM 502 or the recording unit 508.

The program to be executed by the computer may be a program for performing processes in chronological order in accordance with the sequence described in this specification, or may be a program for performing processes in parallel or performing a process when necessary, such as when there is a call.

It should be noted that embodiments of the present technology are not limited to the above-escribed embodiments, and various modifications may be made to them without departing from the scope of the present technology.

For example, the present technology can be embodied in a cloud computing structure in which one function is shared among devices via a network, and processing is performed by the devices cooperating with one another.

The respective steps described with reference to the above described flowcharts can be carried out by one device or can be shared among devices.

In a case where more than one process is included in one step, the processes included in the step can be performed by one device or can be shared among devices.

The advantageous effects described in this specification are merely examples, and the advantageous effects of the present technology are not limited to them and may include other effects.

Further, the present technology may take the following forms.

(1) An image processing device including:
a focus area determining unit that calculates focus scores based on a photographed image, the focus scores indicating the degrees of focus of respective areas in the photographed image;
a warning determining unit that determines the degree of focus in a predetermined area in the photographed image in accordance with the focus scores; and
a warning unit that issues a warning in accordance with a result of the focus determination.

(2) The image processing device of (1), wherein the warning determining unit determines the degree of focus by comparing the average value of the focus scores for respective areas in the predetermined area with a threshold value.

(3) The image processing device of (1) or (2), wherein the predetermined area is a focus area subjected to focusing at the time when the photographed image is taken.

(4) The image processing device of (3), wherein the focus area determining unit calculates the focus scores only for the predetermined area in the photographed image.

(5) The image processing device of (1) or (2), wherein the predetermined area is an area designated by a user in the photographed image.

(6) The image processing device of (1) or (2), wherein the predetermined area is a face area detected from the photographed image.

(7) The image processing device of any of (1) through (6), wherein the warning unit issues the warning by displaying the warning superimposed on the photographed image.

(8) The image processing device of any of (1) through (6), wherein the warning unit issues the warning by outputting a warning sound.

(9) The image processing device of any of (1) through (6), wherein the warning unit issues the warning by vibrating.

(10) The image processing device of any of (1) through (6), wherein the warning unit issues the warning by emitting light.

(11) The image processing device of any of (1) through (10), wherein the warning unit changes the warning in accordance with the average value of the focus scores.

(12) An image processing method including the steps of:
calculating focus scores based on a photographed image, the focus scores indicating the degrees of focus of respective areas in the photographed image;
determining the degree of focus in a predetermined area in the photographed image in accordance with the focus scores; and
issuing a warning in accordance with a result of the focus determination.

(13) A program for causing a computer to perform a process including the steps of:
calculating focus scores based on a photographed image, the focus scores indicating the degrees of focus of respective areas in the photographed image;

determining the degree of focus in a predetermined area in the photographed image in accordance with the focus scores; and issuing a warning in accordance with a result of the focus determination.

REFERENCE SIGNS LIST

11 Imaging apparatus
26 Display unit
53 User interface
58 Vibrating unit
59 Speaker
60 Light emitting device
77 Focus area determining unit
78 Face detecting unit
79 Memory
80 Processing unit for display
81 Vibrator driving unit
82 Speaker driving unit
83 Light emitting device driving unit
84 Focus lens control unit
85 Warning control unit
121 Multifunctional portable telephone device
211 Wearable camera

The invention claimed is:

1. An image processing device, comprising:
at least one processor configured to:
calculate a plurality of focus scores of a plurality of different areas in a first area of a photograph image, wherein the plurality of focus scores indicates degrees of focus of the plurality of different areas in the first area of the photographed image;
determine a degree of focus in the first area based on the plurality of focus scores of the plurality of different areas in the first area of the photographed image; and
issue a warning notification based on the determined degree of focus.

2. The image processing device according to claim 1, wherein the at least one processor is further configured to detect a face area of a subject during a focusing operation, wherein the first area is the detected face area.

3. The image processing device according to claim 2, wherein the at least one processor is further configured to calculate the plurality of focus scores for the detected face area.

4. The image processing device according to claim 2, wherein the at least one processor is further configured to control a memory to store Exchangeable Image File Format (EXIF) data comprising face area information of the detected face area.

5. The image processing device according to claim 2, wherein a calculated average value of the plurality of focus scores indicates a degree of focus in a second area near a most-focused area of the first area, and wherein the most-focused area has a highest focus score.

6. The image processing device according to claim 5, wherein the calculated average value is an average value of the plurality of focus scores, which are more than a threshold score, in a detected face area.

7. The image processing device according to claim 1, wherein the first area is designated by a user input.

8. The image processing device according to claim 1, wherein the at least one processor is further configured to control a display screen to display the warning notification based on a superimposed image on the first area.

9. The image processing device according to claim 1, wherein the at least one processor is further configured to issue a warning sound as the warning notification through a speaker device.

10. The image processing device according to claim 1, wherein the at least one processor is further configured to issue a vibrator warning as the warning notification through a vibrator unit.

11. The image processing device according to claim 1, wherein the at least one processor is further configured to issue the warning notification based on light emission by a light emitting device.

12. The image processing device according to claim 1, wherein the at least one processor is further configured to change the warning notification based on an average value of the plurality of focus scores.

13. The image processing device according to claim 1, wherein the degree of focus is a sum of absolute values of high pass components of respective pixels in the plurality of different areas.

14. The image processing device according to claim 1, wherein the at least one processor is further configured to calculate the plurality of focus scores based on a discriminator obtained through a machine learning technique.

15. The image processing device according to claim 1, wherein the at least one processor is further configured to determine the degree of focus in the first area, based on a comparison of an average value of the plurality of focus scores of the plurality of different areas in the first area with a threshold value.

16. An image processing method, comprising:
calculating, by at least one processor, a plurality of focus scores of a plurality of different areas in an area of a photographed image,
wherein the plurality of focus scores indicate degrees of focus of the plurality of different areas in the area of the photographed image;
determining, by the at least one processor, a degree of focus in the area based on the plurality of focus scores of the plurality of different areas in the area of the photographed image; and
issuing a warning notification based on the determined degree of focus.

17. A non-transitory computer-readable medium having stored thereon computer-executable instructions, which when executed by a processor of an image processing device, cause the processor to execute operations, the operations comprising:
calculating a plurality of focus scores of a plurality of different areas in an area of a photographed image,
wherein the plurality of focus scores indicate degrees of focus of the plurality of different areas in the area of the photographed image;
determining a degree of focus in the area based on the plurality of focus scores of the plurality of different areas in the area of the photographed image; and
issuing a warning notification based on the determined degree of focus.

18. An image processing device, comprising:
at least one processor configured to:
calculate a plurality of focus scores of a plurality of different areas in an area of a photographed image, wherein the plurality of focus scores indicates degrees of focus of the plurality of different areas in the area of the photographed image;

determine a degree of focus in the area based on a comparison of an average value of the plurality of focus scores of the plurality of different areas with a threshold value; and issue a warning notification based on the determined degree of focus.

* * * * *